(12) United States Patent
Minamino et al.

(10) Patent No.: US 7,240,002 B2
(45) Date of Patent: Jul. 3, 2007

(54) SPEECH RECOGNITION APPARATUS

(75) Inventors: Katsuki Minamino, Tokyo (JP);
Yasuharu Asano, Kanagawa (JP);
Hiroaki Ogawa, Chiba (JP); Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 1008 days.

(21) Appl. No.: 10/416,092

(22) PCT Filed: Nov. 7, 2001

(86) PCT No.: PCT/JP01/09711

§ 371 (c)(1),
(2), (4) Date: May 5, 2003

(87) PCT Pub. No.: WO02/39426

PCT Pub. Date: May 16, 2002

(65) Prior Publication Data
US 2005/0075877 A1 Apr. 7, 2005

(30) Foreign Application Priority Data
Nov. 7, 2000 (JP) .............................. 2000-338458

(51) Int. Cl.
*G10L 15/04* (2006.01)
(52) U.S. Cl. ...................... 704/253; 704/236
(58) Field of Classification Search ...................... None
See application file for complete search history.

(56) References Cited

U.S. PATENT DOCUMENTS

| 4,481,593 | A | * | 11/1984 | Bahler | 704/253 |
|---|---|---|---|---|---|
| 4,489,435 | A | * | 12/1984 | Moshier | 704/244 |
| 4,713,777 | A | * | 12/1987 | Klovstad et al. | 704/233 |
| 4,713,778 | A | * | 12/1987 | Baker | 704/254 |
| 4,718,092 | A | * | 1/1988 | Klovstad | 704/239 |
| 4,888,823 | A | * | 12/1989 | Nitta et al. | 704/249 |
| 4,980,918 | A | * | 12/1990 | Bahl et al. | 704/240 |
| 5,794,194 | A | | 8/1998 | Takebayashi et al. | |
| 2005/0075877 | A1 | * | 4/2005 | Minamino et al. | 704/254 |
| 2005/0190973 | A1 | * | 9/2005 | Kristensson et al. | 382/229 |
| 2005/0216443 | A1 | * | 9/2005 | Morton et al. | 707/3 |

FOREIGN PATENT DOCUMENTS

| EP | 0 430 615 | 6/1991 |
|---|---|---|
| JP | 2880436 | 1/1999 |
| JP | 3004023 | 11/1999 |
| JP | 3058125 | 4/2000 |

* cited by examiner

*Primary Examiner*—David D. Knepper
(74) *Attorney, Agent, or Firm*—Frommer Lawrence & Haug LLP; William S. Frommer

(57) ABSTRACT

The present invention provides a speech recognition apparatus having high speech recognition performance and capable of performing speech recognition in a highly efficient manner. A matching unit 14 calculates the scores of words selected by a preliminary word selector 13 and determines a candidate for a speech recognition result on the basis of the calculated scores. A control unit 11 produces word connection relationships among words included in a word series employed as a candidate for the speech recognition result and stores them into a word connection information storage unit 16. A reevaluation unit 15 corrects the word connection relationships one by one. On the basis of the corrected word connection relationships, the control unit 11 determines the speech recognition result. A word connection managing unit 21 limits times allowed for a boundary between words represented by the word connection relationships to be located thereat. A word connection managing unit 22 limits start times of words preliminarily selected by the preliminary word selector 13. The present invention can be applied to an interactive system that recognizes an input speech and responds to the speech recognition result.

23 Claims, 20 Drawing Sheets

FIG. 9

| TIME INTERVAL | 1 | 2 | 3 | 4 | 5 | 6 | 7 | 8 |
|---|---|---|---|---|---|---|---|---|
| CORRECT WORD RECOGNITION RATE | 92.31 | 93.33 | 92.31 | 92.31 | 90.77 | 89.23 | 91.28 | 90.26 |

SPEECH RECOGNITION APPARATUS

TECHNICAL FIELD

The present invention relates to a speech recognition apparatus, and more particularly, to a speech recognition apparatus capable of performing high-precision speech recognition in a highly efficient manner.

BACKGROUND ART

FIG. 1 illustrates a conventional speech recognition apparatus.

A speech uttered by a user is input to a microphone 1 and converted into an electrical speech signal. The speech signal is supplied to an A/D (analog-to-digital) converter 2. The A/D converter 2 samples and quantizes the speech signal supplied from the microphone 1 thereby converting the speech signal into digital speech data. The resultant speech data is supplied to a feature extracting unit 3.

The feature extracting unit 3 performs an acoustic process on the speech data supplied from the A/D converter 2 on a frame-by-frame basis to extract feature values such as MFCC's (Mel-Frequency Cepstrum Coefficients). The resultant extracted feature values are supplied to a matching unit 4. The feature values extracted by the feature extracting unit 3 are not limited to MFCC's, but other types of feature values such as spectra, linear prediction coefficients, cepstrum coefficients, or line spectra may also be extracted.

The matching unit 4 analyzes the feature values supplied from the feature extracting unit 3 while referring to an acoustic model database 5, a dictionary database 6, and a grammar database 7 as required, thereby recognizing the speech input via the microphone 1 using the continuous-distribution HMM method or the like.

The acoustic model database 5 stores an acoustic model representing acoustic characteristics of respective phonemes and syllables of the speech, in a particular language, to be recognized. When the speech recognition is performed using the continuous-distribution HMM algorithm, the acoustic model based on the HMM (Hidden Markov Model) is used. The dictionary database 6 stores a word dictionary describing information about pronunciations of the respective words (vocabulary) to be recognized. The grammar database 7 stores a grammar (language model) describing how the respective words stored in the word dictionary 6 can be concatenated (connected) with each other. As for the grammar, a context-free grammar (CFG), a statistical word concatenation probability model (N-gram) or the like is used.

The matching unit 4 creates acoustic models of words (word model) by applying the acoustic models stored in the acoustic model database 5 to the words described in the word dictionary stored in the dictionary database 6. Furthermore, the matching unit 4 concatenates some word models with each other on the basis of the grammar stored in the grammar database 7 and recognizes the speech input via the microphone 1 using the concatenated word models, in accordance with the continuous-distribution HMM algorithm. That is, the matching unit 4 detects a series of word models that results in a highest score (most likelihood) when applied to the feature values output in time sequence from the feature extracting unit 3 and employs a series of words corresponding to the detected series of word models as the result of speech recognition.

More specifically, the matching unit 4 calculates the sum of the occurrence probabilities of respective feature values for a series of words corresponding to the concatenated word models, and employs the sum as the score of the series of words. Of various series of words, one which has a highest score is employed as the speech recognition result.

In general, the score is determined by totally evaluating the acoustic score calculated on the basis of the acoustic model stored in the acoustic model database 5 (hereinafter referred to simply as an acoustic score) and the language score calculated on the basis of the grammar stored in the grammar database 7 (hereinafter referred to simply as a language score).

More specifically, for example, in the case where the HMM method is used, the acoustic score is calculated for each word on the basis of probabilities of occurrences, determined from the acoustic models, of a series of feature values output from the feature extracting unit 3. On the other hand, in the case where the bigram is used, the language score is determined on the basis of the probability of connection between a word of interest and an immediately preceding word. The overall score is then determined by totally evaluating the acoustic scores and the language scores of the respective words (hereinafter, an overall score determined in such a manner will be referred to simply as an overall score), and the speech recognition result is determined on the basis of the overall score.

More specifically, when a series of N words is given, if a kth word is represented by $w_k$ and the acoustic and language scores of the word $w_k$ are represented by $A(w_k)$ and $L(w_k)$, respectively, the overall score S of that series of words can be calculated according to, for example, the following equation:

$$S = \Sigma(A(w_k) + C_k \times L(w_k)) \tag{1}$$

where $\Sigma$ represents the summation for k=1 to N, and $C_k$ represents the weighting factor for the language score $L(w_k)$ of the word $w_k$.

The matching unit 4 performs a matching process to determine N and the series of words $w_1, w_2, \ldots, w_N$ which result in the maximum score calculated according to, for example, equation (1), and the resultant series of words $w_1, w_2, \ldots, w_N$ is output as the speech recognition result.

For example, if a user utters speech "New York ni yukitai desu" ("I want to go to New York."), the speech recognition apparatus shown in FIG. 1 calculates the acoustic scores and the language scores of respective words "New York", "ni", "yukitai", and "desu". When the calculated acoustic scores and language scores result in a highest overall score, the series of words "New York", "ni", "yukitai", and "desu" is output as the speech recognition result.

In this specific example, if the word dictionary of the dictionary database 6 includes five words "New York", "ni", "yukitai", and "desu" and if they are all the word dictionary includes, then these five words can be arranged into a word series as many ways as $5^5$. Thus, in a simplest manner of evaluation, the matching unit 4 evaluates $5^5$ series of words and selects, from $5^5$ series of words, one series of words that best matches the speech uttered by the user (i.e., series of words having the highest overall score). The number of ways that words can be arranged into a word series is given by the number of words raised to the power of the number of words, and thus the number of word series to be evaluated increases tremendously with the number of words registered in the word dictionary.

Because the number of words included in speech is generally unknown, not only series of five words but also series of a different number of words such as a series of one word, series of two words, and so on, have to be evaluated.

This results in a further increase in the number of word series that should be evaluated. Thus, from the viewpoint of the amount of computation and the memory space used in the calculation, it is very important to efficiently determine a most likely word series as the speech recognition result from the huge number of word series.

One technique of reducing the amount of computation and the memory space is to terminate the calculation of the score when the acoustic score becomes lower than a predetermined threshold value in the middle of the acoustic score calculation process. This is called an acoustic pruning method. Another technique is to linguistically prune words on the basis of the language score to reduce the number of words to be evaluated.

By using such a pruning method, it is possible to limit the calculation of the score to particular words selected in accordance with a predetermined criterion (such as the acoustic scores or the language scores of words obtained in the middle of the calculation), thereby reducing the amount of computation. However, if the pruning is performed to a too great extent, that is, if the criterion is too strict, there can be a possibility that a correct word to be included in the speech recognition result is discarded, and thus the speech recognition result becomes wrong. Therefore, when the pruning method is employed, there should be a sufficiently large margin in the pruning process so that correct words to be included in the speech recognition are not discarded. This makes it difficult to greatly reduce the amount of computation. If the calculation of the acoustic score is performed independently for all words to be calculated, a large amount of computation is required. To avoid the above problem, it has been proposed to partially commonize (share) the calculation of the score for a plurality of words. One method of commonizing the calculation for a plurality words whose phonemes in the beginning part are equal to each other is to construct a tree-structured network by applying the same acoustic models to the beginning part having the same phonemes and applying individual acoustic modes to following different phonemes, and determine the acoustic score using the tree-structured network. By way of example, when the word dictionary includes a word "Akita" whose pronunciation information is registered as "akita" and also includes a word "Akebono" whose pronunciation information is registered as "akebono", the acoustic score of words "Akita" and "Akebono" are calculated in common for the first and second phonemes a and k. The acoustic scores of the remaining phonemes k, i, t, and a of the word "Akita" and the acoustic scores of the remaining phonemes e, b, o, n, and o of the word "Akebono" are calculated independently.

This technique allows a great reduction in the amount of computation required to determine the acoustic scores.

However, in this technique, when the acoustic score of a common part of words is being calculated, it is impossible to identify which word is being subjected to the calculation of the acoustic score. In the specific example of calculation of acoustic scores for words "Akita" and "Akebono", when the acoustic scores of the first and second phonemes a and k are being calculated, it is impossible to identify whether the acoustic score is being calculated for "Akita" or "Akebono".

As for "Akita", in this specific case, when the calculation of the acoustic score of the third phoneme "i" is started, it becomes possible to identify that the word being calculated is "Akita". Similarly, in the case of the word "Akebono", when the calculation of the acoustic score of the third phoneme "e" is started, it becomes possible to identify that the word being calculated is "Akebono".

That is, if the calculation of the acoustic scores is performed in common for overlapping parts of a plurality of words, it is impossible, at the point of time at which the calculation of the acoustic score of a word is started, to identify which word is currently being calculated, and thus it is impossible to apply a corresponding language score to that word. Therefore, it is difficult to perform the word pruning process before starting the calculation of the acoustic scores of words. This causes unnecessary calculation to be performed.

Furthermore, in the case where the calculation of acoustic scores is partially commonized, a tree-structured network including all words of the word dictionary is formed, and a large memory space is needed to store the tree-structured network.

Another technique of reducing the amount of computation and the memory space is to, instead of calculating the acoustic scores for all words registered in the word dictionary, preliminary select words and calculate the acoustic scores for only those preliminary selected words. The preliminary selection is performed on the basis of an acoustic model or grammar which is simple but not very strict.

An example of the manner of preliminary selection can be found in "A Fast Approximate Acoustic Match for Large Vocabulary Speech Recognition" (V. De Gennaro, P. S. Gopalakrishnan and R. L. Mercer, IEEE Trans. Speech and Audio Proc., vol. 1, pp. 59-67, 1993), When the acoustic score of a word is calculated using a series of feature values of a given speech, the acoustic score changes depending on the location of the start point or the end point of the series of feature values used in the calculation. This change in the acoustic score affects the overall score determined from the acoustic scores and the language scores in accordance with equation (1).

The start and end points of a series of feature values corresponding to a word, i.e., boundaries between adjacent words (word boundaries) may be determined, for example, by a dynamic programming method. In this technique, arbitrary points of a series of feature values are taken as candidates for word boundaries, and the acoustic score and the language score are calculated for each word of the series of words taken as a candidate for the speech recognition result, and the total score of the acoustic score and the language score (hereinafter, such a total score will be referred to as a word score) is cumulatively added from one word to another. A maximum cumulative sum of word scores and candidate word boundaries which result in the maximum cumulative sum are stored.

When the maximum cumulative sum of language scores is finally determined, the word boundaries that result in the best cumulative sum, i.e., the maximum cumulative sum, are also determined.

The method of determining the word boundaries in the above-described manner is called Viterbi decoding or one path decoding. A more detailed description of this method can be found, for example, in an article entitled "Speech Recognition Using a Stochastic Model" by Seiichi Nakagawa published in the Journal of the Institute of Electronics, Information and Communication Engineers, pp. 20-26, Jul. 1, 1988.

In order to efficiently perform the preliminary selection described above, it is very important to properly determine word boundaries. That is, it is very important to properly select a start point of each word in a series of feature values (feature value series).

In a specific example of speech "Kyo wa yoi tenki desune." (which is equivalent, as a whole of sentence, to "What a beautiful day!" wherein on a more strict word-to-word correspondence basis, "kyo" corresponds to "today", "yoi" to "good", "tenki" to "weather", and "desune" to "isn't it", and "wa" is a particle having no corresponding English word.) shown in FIG. 2(A), let us assume that the correct boundary between words "kyo" and "wa" is located at a point of time $t_1$. When the word "wa" following the word "kyo" is preliminary selected, if a time $t_{1-1}$ before the correct time $t_1$ is employed as the start point thereof, then not only the feature value of the word "wa" but also an end part of the word "kyo" immediately before the word "wa" affects the preliminary selection. Conversely, if the preliminary selection is performed such that a point of time $t_{1+1}$ after the correct time $t_1$ is employed as the start point, then the feature value of a beginning part of the word "wa" is not used in the preliminary selection.

In any case, the incorrect starting point adversely affects the preliminary selection and further affects a matching process performed thereafter.

In FIG. 2 (and also FIGS. 4 and 6 which will be referred to later), time elapses from left to right, and speech starts at a time 0 and ends at a time T.

In the dynamic programming method, because the final word boundaries cannot be determined until the calculation of the word score (the acoustic score and the language score) for the last feature value, for example, the feature value at the end time T of a given speech duration in the specific example shown in FIG. 2, is completed, it is difficult to uniquely determine start points of preliminary selected words, i.e., word boundaries at the stage at which the preliminary selection is performed.

In view of the above, candidate word boundaries may be retained until the calculation of word scores using a feature value series in a speech duration is completed.

In this method, for example, when the word score for "kyo" is calculated by employing the start time, 0, of the speech as the start point of the word, if times $t_{1-1}$, $t_1$, and $t_{1+1}$ are obtained as candidates for the end point of the uttered word "kyo", then these three times $t_{1-1}$, $t_1$, and $t_{1+1}$ are retained, and preliminary selections of the next word are made by employing these three times as the start point of the next word.

Herein, let us assume that when the time $t_{1-1}$ is employed as the start point of the preliminary selection, two words "wa" and "yoi" are obtained, when the time $t_1$ is employed as the start point, one word "wa" is obtained, and when the time $t_{1+1}$ is employed as the start point, two words "wa" and "yoi" are obtained. Let us further assume that by calculating the word scores for the respective words described above, candidates for a partial word series are obtained as shown in FIG. 2(B) to 2(G).

That is, in FIG. 2(B), the word score for the word "wa" is calculated by employing the time $t_{1-1}$ as the start point, and a time $t_2$ is obtained as a candidate for the end point thereof. In FIG. 2(C), the word score for the word "yoi" is calculated by employing the time $t_{1-1}$ as the start point, and a time $t_{2+1}$ is obtained as a candidate for the end point thereof. In FIG. 2(D), the word score for the word "wa" is calculated by employing the time $t_1$ as the start point, and a time $t_{2+1}$ is obtained as a candidate for the end point thereof. In FIG. 2(E), the word score for the word "wa" is calculated by employing the time $t_1$ as the start point, and a time $t_2$ is obtained as a candidate for the end point thereof. In FIG. 2(F), the word score for the word "wa" is calculated by employing the time $t_{1+1}$ as the start point, and a time $t_2$ is obtained as a candidate for the end point thereof. In FIG. 2(G), the word score for the word "wa" is calculated by employing the time $t_{1+1}$ as the start point, and a time $t_{2+2}$ is obtained as a candidate for the end point thereof. In FIG. 2, $t_{1-1} < t_1 < t_{1+1} < t_2 < t_{2+1} < t_{2+2}$.

Of the calculations shown in FIG. 2(B) to 2(G), those shown in FIGS. 2(B), 2(E), and 2(F) have the same series of words "kyo" and "wa" as a candidate for the speech recognition result, and the end point of the last word "wa" of the series of words is equally located at the time $t_2$. Thus, it is possible to select a best one from those shown in FIGS. 2(B), 2(E), and 2(F) on the basis of the cumulative sum of word scores calculated for series of words ending at the time $t_2$ and can discard the other.

However, at this point of time, it is impossible to select a correct one from a group consisting of the candidate selected above and the remaining three candidates shown in FIGS. 2(C), 2(D), and 2(G) and the candidate shown in FIGS. 2(C), 2(D), and 2(G). Thus these four candidates are retained, and a further preliminary selection of a following word is made for each of these four candidates.

Thus, in the calculation of word scores according to this method, it is needed to retain a large number of candidates for word boundaries until the calculation of word scores for a series of feature values in a speech duration is finally completed. This is undesirable from the standpoint of the amount of computation and the efficient use of the memory space.

In this technique, if all correct word boundaries are included in retained candidates for word boundaries, it is theoretically possible to finally obtain the correct word boundaries as can be obtained by the dynamic programming method. However, if a correct word boundary is not included in the retained candidates, a word starting from that boundary or a word ending at that boundary is recognized wrongly, and this can further cause following words to be wrongly recognized.

In general, preliminary selections are made on the basis of an acoustic model or a grammar which is simple but not very strict. Because a preliminary selection is made from all words registered in the word dictionary, if a high-precision acoustic model or grammar is employed in the preliminary selection, it is needed to perform a large amount of calculation using a large memory space in real time. To avoid the above problem, the preliminary selection is performed using a simple acoustic model and a simple grammar thereby making it possible to perform the preliminary selection using a relatively small amount of resource at a high speed even when the preliminary selection is made from a set of huge number of words.

In the preliminary selection, after determining a likely end point of a word by means of a matching process using a series of feature values (feature value series), a preliminary selection of a following word starting at the end point of the preliminarily selected previous word is made using a feature value series starting at a point of time corresponding to the start point of the following word. That is, the preliminary selection is made at a processing stage at which boundaries (word boundaries) between words included in a speech utterance have not been finally determined.

Therefore, if the start point or the end point of a series feature values used in the preliminary selection has a deviation from the start point or the end point of a corresponding word, then the series of feature values employed in the preliminary selection includes some feature values of phonemes of a word immediately before or after the present word and lacks some parts of feature values at the beginning or the end of the present word. Thus, the preliminary selection is performed using the series of feature values which are acoustically unstable.

Therefore, in the case where a simple acoustic model is used in the preliminary selection, there is a possibility that a word included in a speech utterance is not selected. If a word included in a speech utterance is missed in the preliminary selection, the matching process is not performed for that missed word, and thus the resultant speech recognition becomes wrong.

One technique of avoiding the above problem is to reduce the rigidity of the acoustic and/or linguistic criteria used in the preliminary selection so that a greater number of words are selected. Another technique is to employ a high-precision acoustic model and/or grammar.

However, if the rigidity of the acoustic and/or linguistic criteria used in the preliminary selection is reduced, it becomes necessary to perform the matching process on a large number of words having a low possibility of being selected in the final speech recognition result. This results in great increases in the amount of calculation and the memory space needed to perform the matching process which needs a greater amount of calculation and a greater memory space per word than needed in the preliminary selection process.

On the other hand, if a high-precision acoustic model and/or grammar is employed in the preliminary selection, the result is a great increase in the resource needed in the preliminary selection.

DISCLOSURE OF INVENTION

In view of the above, an object of the present invention is to provide a technique of performing a high-precision speech recognition process in a highly efficient manner without causing degradation in recognition performance.

A first speech recognition apparatus according to the present invention comprises: production means for calculating the scores of words to be recognized and producing, on the basis of the calculated scores, a word series as a candidate for a speech recognition result; storage means for storing connection relationships among words in the word series to be employed as a candidate for the speech recognition result; correction means for correcting the connection relationships stored in the storage means; determining means for determining a word series as the speech recognition result on the basis of the corrected connection relationships; and word boundary limiting means for limiting the location of a boundary between words represented by the connection relationships stored in the storage means.

A first speech recognition method according to the present invention comprises the steps of: calculating the scores of words to be recognized and producing, on the basis of the calculated scores, a word series as a candidate for a speech recognition result; storing connection relationships among words in the word series to be employed as a candidate for the speech recognition result; correcting the connection relationships stored in the storage step; determining a word series as the speech recognition result on the basis of the corrected connection relationships; and limiting the location of a boundary between words represented by the connection relationships stored in the storage step.

A first storage medium according to the present invention includes a program stored therein comprising the steps of calculating the scores of words to be recognized and producing, on the basis of the calculated scores, a word series as a candidate for a speech recognition result; storing connection relationships among words in the word series to be employed as a candidate for the speech recognition result; correcting the connection relationships stored in the storage step; determining a word series as the speech recognition result on the basis of the corrected connection relationships; and limiting the location of a boundary between words represented by the connection relationships stored in the storage step.

A second speech recognition apparatus according to the present invention comprises: selection means for selecting one or more words to be placed following an already-selected word included in a word series to be employed as a candidate for the speech recognition result, from a set of speech-recognizable words; production means for calculating the score of the one or more words selected by the selection means and producing, on the basis of the calculated scores, a word series to be employed as a candidate for a speech recognition result; determining means for selecting one word series as a determinate speech recognition result from the word series that have been produced as candidates for the speech recognition result; and start location limiting means for limiting the start location of a word selected by the selection means.

A second speech recognition method according to the present invention comprises the steps of: selecting one or more words to be placed following an already-selected word included in a word series to be employed as a candidate for the speech recognition result, from a set of speech-recognizable words; calculating the score of the one or more words selected in the selection step and producing, on the basis of the calculated scores, a word series to be employed as a candidate for a speech recognition result; selecting one word series as a determinate speech recognition result from the word series that have been produced as candidates for the speech recognition result; and limiting the start location of a word selected in the selection step.

A second storage medium according to the present invention includes a program stored therein comprising the steps of: selecting one or more words to be placed following an already-selected word included in a word series to be employed as a candidate for the speech recognition result, from a set of speech-recognizable words; calculating the score of the one or more words selected in the selection step and producing, on the basis of the calculated scores, a word series to be employed as a candidate for a speech recognition result; selecting one word series as a determinate speech recognition result from the word series that have been produced as candidates for the speech recognition result; and limiting the start location of a word selected in the selection step.

In the first speech recognition apparatus, the first speech recognition method, and the first storage medium, the scores of words to be recognized are calculated and a word series to be employed as a candidate for a speech recognition result is produced on the basis of the calculated scores. Connection relationships among words in the word series to be employed as a candidate for the speech recognition result are corrected, and a word series indicating the speech recognition result is determined on the basis of the corrected connection relationships. In the above process, locations of boundaries between words, represented by the connection relationships, in a word series to be employed as a candidate of the speech recognition result are limited.

In the second speech recognition apparatus, the second speech recognition method, and the second storage medium, one or more words to be placed following an already-selected word included in a word series to be employed as a candidate for the speech recognition result is selected from a set of speech-recognizable words, and the scores for the selection words are calculated. Word series employed as candidates for the speech recognition result are produced on the basis of the calculated scores, and one of them is selected as a determinate speech recognition result. In the above process, start locations words selected from the set of speech-recognizable words are limited.

BRIEF DESCRIPTION OF THE DRAWINGS

FIG. 9 is a table showing a result of simulation.

BEST MODE FOR CARRYING OUT THE INVENTION

Figure 1:
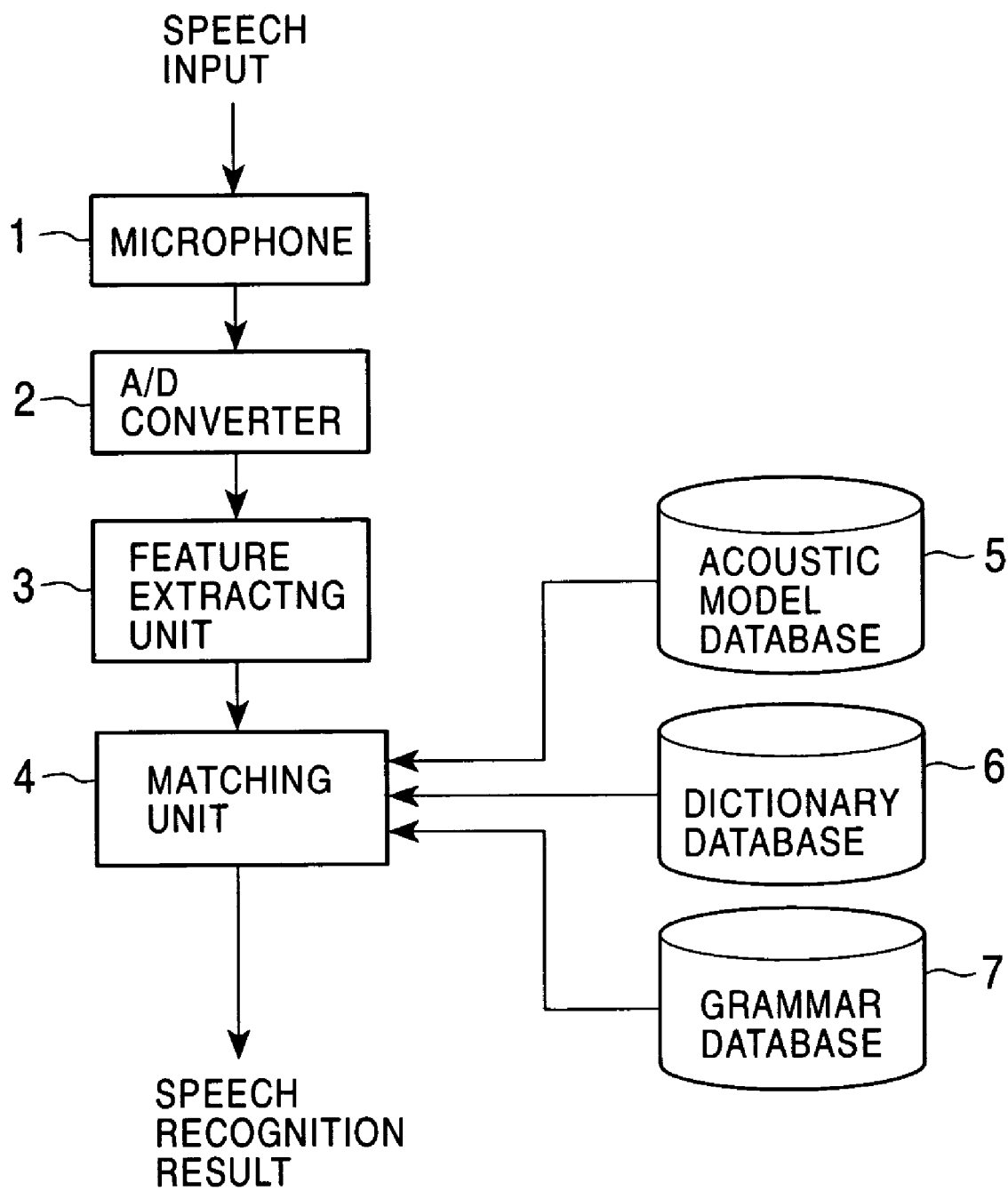
FIG. 1 is a block diagram illustrating a conventional speech recognition apparatus.
Figure 3:
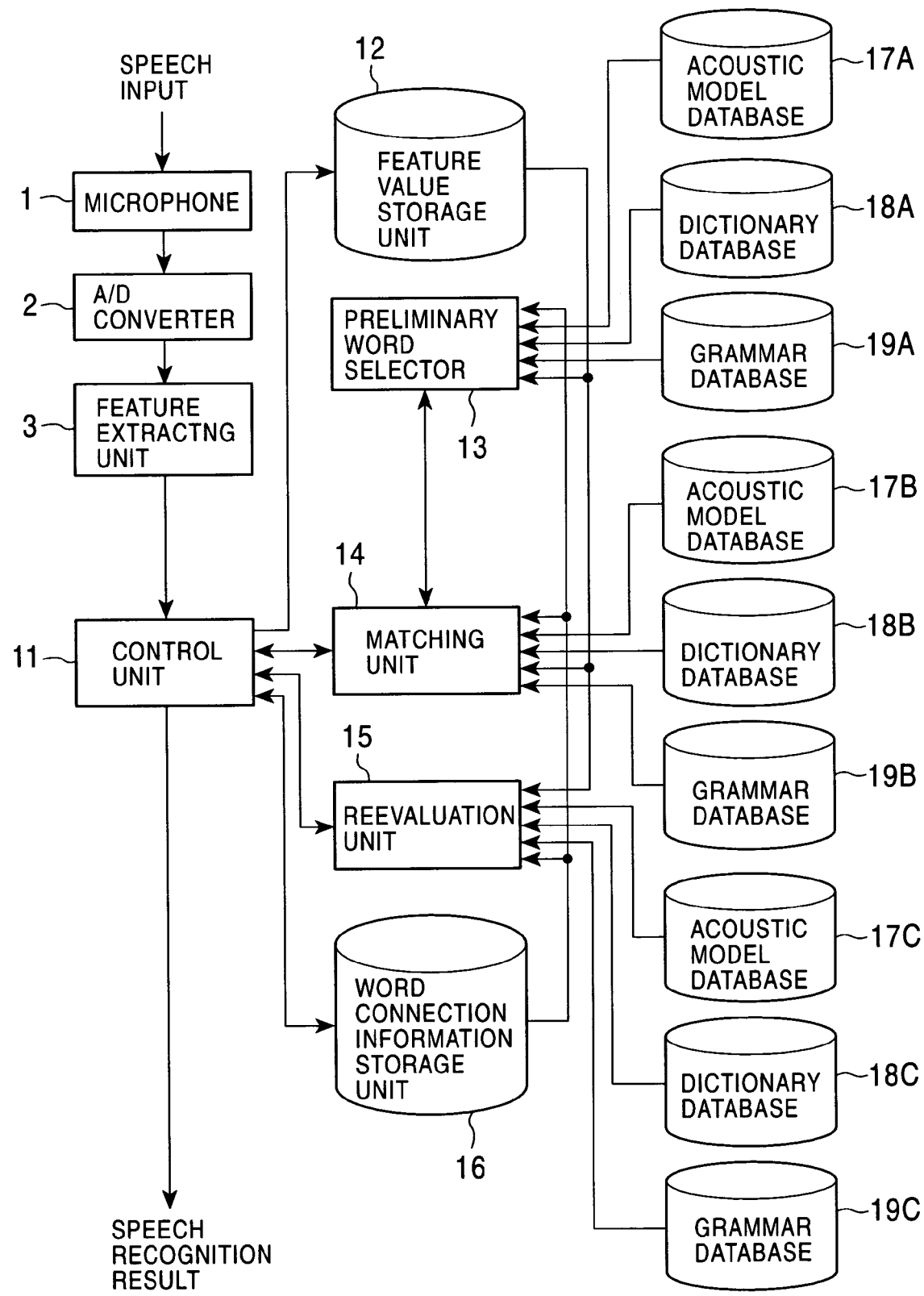
FIG. 3 is a block diagram illustrating a speech recognition apparatus according to the present invention.

FIG. 3 illustrates an embodiment of a speech recognition apparatus according to the present invention. In this figure, similar parts to those in FIG. 1 are denoted by similar reference numerals, and they are not described in further detail herein.

A series of feature values of a speech uttered by a user is output from a feature value extracting unit 3 and supplied on a frame-by-frame basis to a control unit 11. The control unit 11 transfers the feature values received from the feature value extracting unit 3 to a feature value storage unit 12.

The control unit 11 accesses word connection information stored in a word connection information storage unit 16 and controls a matching unit 14 and a reevaluation unit 15. Furthermore, in accordance with an acoustic score and a language score produced as a result of a matching process performed by the matching unit 14 in a similar manner as is performed by the matching unit 4 shown in FIG. 1, the control unit 11 produces word connection information and updates the content of the word connection information storage unit 16 according to the produced word connection information. The control unit 11 also corrects the content of the word connection information storage unit 16 in accordance with the output from the reevaluation unit 15. Furthermore, the control unit 11 determines and outputs a final speech recognition result on the basis of the word connection information stored in the word connection information storage unit 16.

The feature value storage unit 12 retains the series of feature values supplied from the control unit 11 until a speech recognition result for a speech uttered by a user is obtained. The control unit 11 detects times, with reference to the start time (defined as, for example, 0) of a speech duration, at which feature values output from the feature extracting unit 3 are obtained (hereinafter, such times will be referred to as extraction times), and the control unit 11 supplies data indicating the extraction times together with the feature values to the feature value storage unit 12. The feature value storage unit 12 stores the received feature values together with the associated extraction times. The feature values and the associated extraction times stored in the feature value storage unit 12 can be accessed by a preliminary word selector 13, the matching unit 14, and the reevaluation unit 15, as required.

In response to a request issued from the matching unit 14, the preliminary word selector 13 refers to the word connection information storage unit 16, an acoustic model database 17A, a dictionary database 18A, and a grammar database 19A, as required, and preliminarily selects one or more words using the feature values stored in the feature value storage unit 12 and supplies the resultant preliminarily selected words to the matching unit 14, for use of the matching process performed by the matching unit 14.

Under the control of the control unit 11, the matching unit 14 refers to the word connection information storage unit 16, the acoustic model database 17B, the dictionary database 18B, and the grammar database 19B, as required, and performs the matching process on the preliminarily selected words supplied from the preliminary word selector 13, using the feature values stored in the feature value storage unit 12. The result of the matching process is supplied to the control unit 11.

Under the control of the control unit 11, the reevaluation unit 15 refers to an acoustic model database 17C, a dictionary database 18C, and a grammar database 19C, as required, and reevaluates the word connection information stored in the word connection information storage unit 16 using the feature values stored in the feature value storage unit 12. The reevaluation result is supplied to the control unit 11.

The word connection information storage unit 16 retains the word connection information supplied from the control unit 11 until a speech recognition result for the speech uttered by the user is obtained.

The word connection information represents the relationships in terms of connections (chains or concatenations)

between words included in series of words selected as candidates for a final speech recognition result, and the word connection information also includes acoustic scores and language scores of respective words and data indicating the start and end times of the respective words.

Figure 4:
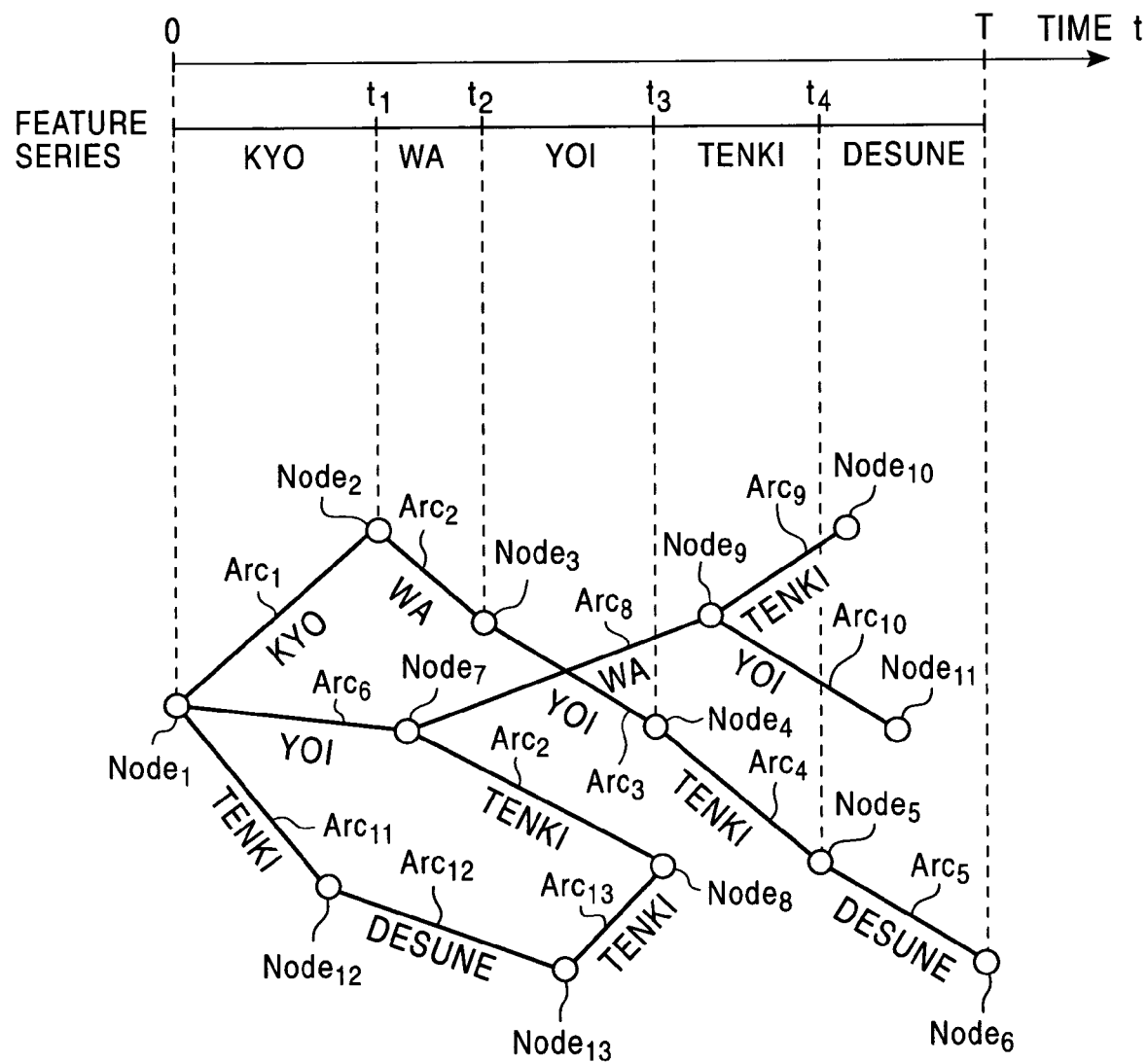
FIG. 4 is a diagram illustrating word connection information.

FIG. 4 illustrates, in the form of a graph structure, word connection information stored in the word connection information storage unit 16.

In the embodiment shown in FIG. 4, the graph structure representing the word connection information includes arcs (denoted by line segments between open circles in FIG. 4) and nodes (denoted by open circles in FIG. 4) wherein each arc indicates a word and each node indicates a boundary between words.

Each node includes time information indicating a time at which a corresponding feature value was extracted. In FIG. 4, because each extraction time represents a time at which a feature value output from the feature extracting unit 3 is obtained, as measured with respect to the start time, defined as time=0, of a speech duration, the time information held by the node $Node_1$ corresponding to the start point of a first word, i.e., the start point of the speech duration is 0. A node can be a start node or an end node of an arc. The time information held by a start node indicates the start time of a word corresponding to the node and the time information held by an end node indicates the end time of that word. In other words, nodes represent boundaries between words.

In FIG. 4, elapse time proceeds from left to right. Therefore, of nodes located on the left and right ends of an arc, the left-hand node is a start node, and the right-hand node is an end node.

Each arc has an acoustic score and a language score of a word assigned to that arc. Arcs are connected from one to another by connecting the start node of another arc to the end node of a previous arc, thereby forming a series of words as a candidate for a speech recognition result.

That is, to the node $Node_1$ indicating the start of the speech duration, the control unit 11 first connects an arc corresponding to a word that seems to be correct as a recognition result. In the specific example shown in FIG. 4, an arc $Arc_1$ corresponding to "kyo", an arc $Arc_6$ corresponding "yoi", and an arc $Arc_{11}$ corresponding to "tenki" are connected to the node $Node_1$. A determination as to whether a word is likely to be correct as a recognition result is made on the basis of the acoustic score and the language score determined by the matching unit 14.

Similarly, arcs corresponding to words that are likely to be correct are connected to a node $Node_2$ serving as the end node of the arc $Arc_1$ corresponding to "kyo", a node $Node_7$ serving as the end node of the arc $Arc_6$ corresponding to "yoi", a node $Node_{12}$ serving as the end node of the arc $Arc_{11}$ corresponding to "tenki", respectively.

By connecting arcs in the above-described manner, one or more paths are formed by arcs and nodes from left to right starting from the beginning of a speech duration. If all paths reach the end of the speech duration (time T in the specific example shown in FIG. 4), the control unit 11 determines the overall score for each path by calculating the cumulative sum of the acoustic scores and the language scores of arcs included in the path. The control unit 11 selects a path having a highest overall score and employs a series of words given by arcs included in that path as a final speech recognition result. The final speech recognition result is output.

More specifically, in the example shown in FIG. 4, if a highest overall score is obtained for a path starting from the node $Node_1$ and passing through the arc $Arc_1$ corresponding to "kyo", the node $Node_2$, the arc $Arc_2$ corresponding to "wa", the node $Node_3$, the arc $Arc_3$ corresponding to "yoi", the node $Node_4$, the arc $Arc_4$ corresponding to "tenki", the node $Node_5$, the arc $Arc_5$ corresponding to "desune", and the node $Node_6$, then a series of words "kyo", "wa", "yoi", "tenki", and "desune" is output as the speech recognition result.

In the above example, in a given speech duration, an arc is connected to a node from one to another until a path starting from the beginning of the speech duration reaches the end of the speech duration. However, when a certain path has been partially formed, if the score for the partially formed path indicates that the path is apparently incorrect as a speech recognition result, the formation of the path may be terminated (no further arcs may be connected) before reaching the end of the speech duration. In accordance with the above-described rule of forming paths, the end node of one arc serves as a start node of one or more arcs connected thereto, and thus paths are formed so as to spread as branching arcs are added, with the exception that when the end node of a certain arc is equal to an end node of one or more other arcs, these two or more arcs converge to a common end node.

In a case where a grammar in the form of a bigram is employed, two arcs extending from different nodes correspond to the same word. If the end time of the utterance of that word is also the same, then end nodes of these two arcs become coincident with each other.

In FIG. 4, the arc $Arc_7$ extending from the start node $Node_7$ and the arc $Arc_{13}$ extending from the start node $Node_{13}$ both correspond to "tenki", and the end times of the utterance thereof are the same. Thus, these two arcs end at the same node $Node_8$.

Although the commonization of nodes may not be performed, it is desirable to perform commonization to efficiently use the memory space.

Although the bigram grammar is employed in FIG. 4, commodization of nodes is also possible when another grammar such as a trigram grammar is used.

Furthermore, the word connection information stored in the word connection information storage unit 16 can be accessed as required by the preliminary word selector 13, the matching unit 14, and the reevaluation unit 15.

Referring again to FIG. 3, the acoustic model databases 17A, 17B, and 17C basically store acoustic models similar to that stored in the acoustic model database 5 described above with reference to FIG. 1.

However, the difference is in that the acoustic model stored in the acoustic model database 17B is higher in model accuracy than the acoustic model stored in the acoustic model database 17A, and the acoustic model stored in the acoustic model database 17C is higher in model accuracy than the acoustic model stored in the acoustic model database 17B. More specifically, for example, the acoustic model database 17A stores only a one-pattern acoustic model of phonemes and syllables, which does not depend on previous and following contexts, and the acoustic model database 17B stores an acoustic model which depends on context across words, i.e., a cross-word model, in addition to the acoustic model of phonemes and syllables, which does not depend on previous and following contexts. The acoustic model database 17C stores acoustic models of phonemes and syllables, which depend on context within words, in addition to the acoustic models which do not depend on previous and following contexts, and the cross-word model.

The dictionary databases 18A, 18B, and 18C basically store word dictionaries similar to that stored in the dictionary database 6 described above with reference to FIG. 1.

The same set of words is registered in each of the dictionary databases 18A to 18C. However, the word dictionary stored in the dictionary database 18B is higher in accuracy than that stored in the dictionary database 18A, and the word dictionary stored in the dictionary database 18C is higher in accuracy than that stored in the dictionary database 18B. For example, in the word dictionary database 18A, only one pronunciation is registered for each word. However, in the word dictionary of the dictionary database 18B, a plurality of pronunciations are registered for each word, and a further greater number of pronunciations are registered for each word in the word dictionary of the dictionary database 18C.

More specifically, for example, only one pronunciation "ohayou" is registered for a word "ohayo" (which is a Japanese expression corresponding to an English expression of "good morning!") in the word dictionary of the dictionary database 18A, pronunciations "ohayoh" and "ohayo" are registered in addition to "ohayou" in the word dictionary of the dictionary database 18B, and pronunciations "hayou" and "hayoh" are registered in addition to "ohayou", "ohayoh" and "ohayo" in the word dictionary of the dictionary database 18C.

The grammar databases 19A, 19B, and 19C basically store grammars similar to that stored in the grammar database 7 described above with reference to FIG. 1.

However, the grammar stored in the grammar database 19B is higher in accuracy than that stored in the grammar database 19A, and the grammar stored in the grammar database 19C is higher in accuracy than that stored in the grammar database 19B. For example, the grammar stored in the grammar database 19A is based on a unigram (occurrence probability of words), and the grammar stored in the grammar database 19B is based on a bigram (occurrence probability of words taking into account previous words). The grammar database 19C stores a grammar based on a trigram (representing occurrence probabilities of words taking into account the relationship with one or two preceding words) or a context-free grammar.

As described above, the acoustic model database 17A stores a one-pattern acoustic model of phonemes and syllables, the acoustic model database 17B stores a multi-pattern acoustic model of phonemes and syllables, and the acoustic model database 17C stores an acoustic model of a greater number of patterns of phonemes and syllables. The dictionary database 18A stores one pronunciation for each word, the dictionary database 18B stores a plurality of pronunciations for each word, and the dictionary database 18C stores a greater number of pronunciations for each word. The grammar database 19A stores a simple grammar, the grammar database 19B stores a stricter grammar, and the grammar database 19C stores a strictest grammar.

The preliminary word selector 13 refers to the acoustic model database 17A, the dictionary database 18A, and the grammar database 19A to roughly estimate the acoustic scores and the language scores of a large number of words in a short time. On the other hand, the matching unit 14 refers to the acoustic model database 17B, the dictionary database 18B, and the grammar database 19B to more accurately determine the acoustic scores and the language scores of a less number of words. The reevaluation unit 15 refers to the acoustic model database 17C, the dictionary database 18C, and the grammar database 19C to determine very accurate acoustic scores and language scores for a very limited number of words in a short time.

Although in the present embodiment, the acoustic models stored in the respective acoustic model databases 17A to 17C are different in accuracy, the same acoustic model may be stored in all acoustic model databases 17A to 17C. In this case, a single database may be used in common as the acoustic model databases 17A to 17C. Similarly, the contents of the dictionaries of the respective dictionary databases 18A to 18C may be equal to each other, and the grammars stored in the grammar databases 19A to 19C may equal to each other.

Referring to a flow chart shown in FIG. 5, a speech recognition process performed by the speech recognition apparatus shown in FIG. 3 is described below.

A speech uttered by a user is input to a microphone 1 and converted by an A/D converter 2 into digital speech data. The resultant digital speech data is supplied to the feature extracting unit 3. The feature extracting unit 3 sequentially extracts feature values of the speech from the speech data on a frame-by-frame basis and supplies the resultant feature values to the control unit 11.

The control unit 11 detects a speech duration using a proper technique. In the detected speech duration, the control unit 11 supplies the series of feature values supplied from the feature extracting unit 3 together with data indicating corresponding extraction times to the feature value storage unit 12, which stores the received series of feature values and the data indicating extraction time such that each feature value is linked to a corresponding extraction time.

If a speech duration starts, the control unit 11 produces a node (initial node) indicating the start of the speech duration in step S1. The initial node is supplied to the word connection information storage unit 16 and stored therein. That is, in step S1, the control unit 11 stores the node $Node_1$ shown in FIG. 4 into the word connection information storage unit 16.

Thereafter, in step S2, the control unit 11 refers to the word connection information stored in the word connection information storage unit 16 to determine whether there is an intermediate node.

As described earlier, the word connection information shown in FIG. 4 is produced by connecting an arc to an end node and then another arc to the end node of the previous arc, and so on thereby forming a path extending from the beginning of the speech duration to the end thereof. In step S2, of end nodes, those to which no arcs have been connected and which are not located at the end of the speech duration are searched for to determine whether there is an intermediate node (such as $Node_8$, $Node_{10}$, and $Node_{11}$ in FIG. 4).

As described earlier, the speech duration is detected by a proper technique, and times corresponding to the end nodes cam be detected by referring to the time information held by the respective end nodes, and thus it is possible to determined whether a given node having no following arc connected thereto is an intermediate node located before the end of the speech duration, by comparing the time information held by that end node with the end time of the speech duration.

In the case where it is determined in step S2 that there is an intermediate node, the process proceeds to step S3. In step S3, the control unit 11 select one intermediate node included in the word connection information, as a node to which an arc corresponding to a word is to be connected (such a node will be referred to as a node of interest).

In a case where the word connection information includes only one intermediate node, the control unit 11 employs it as a node of interest. When the word connection information includes two or more intermediate nodes, the control unit 11 selects one of them as a node of interest. More specifically, for example, the control unit 11 refers to the time information held by the respective intermediate nodes and selects a node determined to be oldest on the basis of the time information (a node closest to the beginning of the speech duration) or, conversely, a newest node (closest to the end of the speech duration) as a node of interest. Alternatively, the control unit 11 may calculate the cumulative sums of the acoustic scores and language scores of arcs in paths from the initial node to respective intermediate nodes (hereinafter, such a sum will be referred to as a partial cumulative sum) and may select, as a node of interest, an intermediate node located at the end of a path having a highest or lowest cumulative sum.

Thereafter, the control unit 11 issues a command (matching command) to the matching unit 14 and the reevaluation unit 15 to perform a matching process by employing the time information held by the node of interest as a start time.

In step S4, if the reevaluation unit 15 receives the matching command from the control unit 11, the reevaluation unit 15 refers to the word connection information storage unit 16 to detect a series of words represented by arcs in a path from the initial node to the node of interest (hereinafter such a series of words and such a path will be referred to as a partial word series and a partial path, respectively), and the reevaluation unit reevaluates the partial word series. The partial word series is an intermediate result of a series of words obtained as a candidate for speech recognition result via the matching process performed by the matching unit 14 on words preliminarily selected by the preliminary word selector 13, and this intermediate result is reevaluated by the reevaluation unit 15.

More specifically, to calculate the language scores and the acoustic scores for the partial word series, the reevaluation unit 15 reads a series of feature values corresponding to the partial word series from the feature value storage unit 12. That is, the reevaluation unit 15 reads, from the feature value storage unit 12, a series of feature values (feature value series) corresponding to times in the range from the time indicated by the time information held by the initial node at the beginning of the partial path to the time indicated by the time information held by the node of interest. The reevaluation unit 15 then refers to the acoustic model database 17C, the dictionary database 18C, and the grammar database 19C and calculates the language scores and the acoustic scores for the partial word series, using the feature value series read from the feature value storage unit 12. This recalculation is performed without fixing boundaries between words included in the partial word series. That is, in the recalculation of the language scores and the acoustic scores for the partial word series performed by the reevaluation unit 15, the boundaries between words included in the partial word series are determined by the dynamic programming method.

After obtaining word boundaries and the language scores and acoustic scores of respective words included in the partial word series, the reevaluation unit 15 corrects, using these new language scores and acoustic scores, the language scores and the acoustic scores assigned to the arcs of the partial path corresponding to the partial word series stored in the word connection information storage unit 16. Furthermore, on the basis of the newly determined word boundaries, the reevaluation unit 15 corrects the time information assigned to the respective nodes included in the partial path corresponding to the partial word series stored in the word connection information storage unit 16. In the present embodiment, the correction of the word connection information is performed by the reevaluation unit 15 via the control unit 11.

Figure 6:
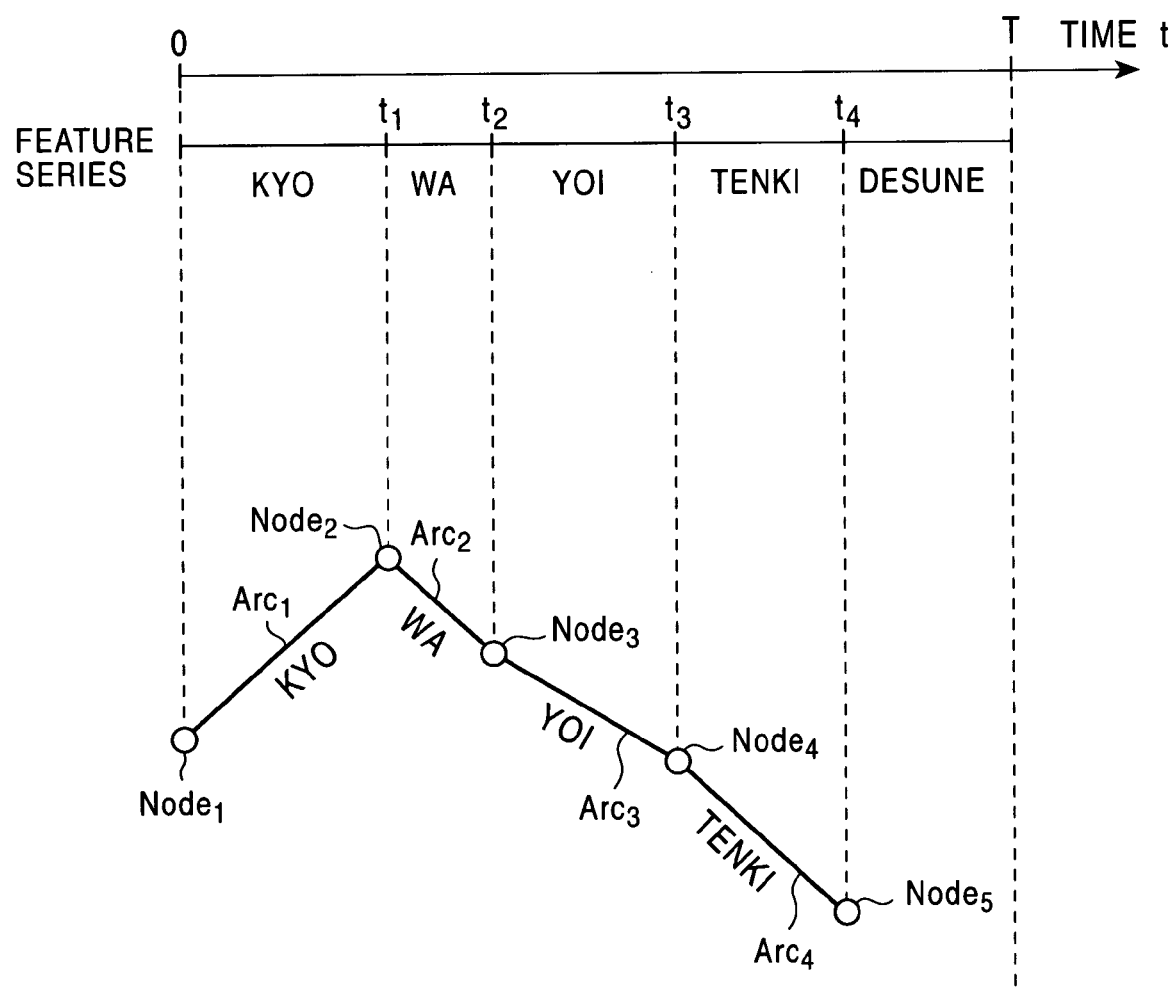
FIG. 6 is a diagram illustrating a process performed by a reevaluation unit 15.

More specifically, for example, when a node $Node_5$ shown in FIG. 6 is given as a node of interest, of partial paths starting from the initial node $Node_1$ and ending at the node $Node_5$ of interest, as for a series of words "yoi" and "tenki" presented by a partial path consisting of a node $Node_3$, an arc $Arc_3$ corresponding to the word "yoi", a node $Node_4$, an arc $Arc_4$ corresponding to the word "tenki", and a node $Node_5$, the reevaluation unit 15 creates word models for the respective words "yoi" and "tenki" by using the series of feature values corresponding to the partial path from the node $Node_3$ to the node $Node_5$ and by referring to the acoustic model database 17C and the dictionary database 18C, and then calculates the acoustic scores on the basis of the word models. Furthermore, the reevaluation unit 15 refers to the grammar database 19C and calculates the languages scores for respective words "yoi" and "tenki". More specifically, for example, in the case where the grammar database 19C stores a trigram grammar, the reevaluation unit 15 determines the probability that the word "yoi", the word "wa" immediately preceding the word "yoi", and the word "kyo" immediately preceding the word "wa" are connected together into a series of words "kyo", "wa", and "yoi", and then calculates the languages scores on the basis of the probability. As for the word "tenki", the reevaluation unit 15 determines the probability that words "tenki", "yoi" located immediate before "tenki", and "wa" located immediately before "tenki" are connected together, and calculates the language score on the basis of the probability.

The reevaluation unit 15 calculates the cumulative sum of the acoustic scores and language scores obtained in the above-described process, and determines the word boundary between "yoi" and "tenki" such that the cumulative sum becomes greatest. On the basis of the acoustic scores and the language scores determined in the above-described manner, the reevaluation unit 15 corrects the acoustic scores and languages scores assigned to the arc $Arc_3$ corresponding to the word "yoi" and the arc $Arc_4$ corresponding to the word "tenki", and the reevaluation unit 15 also corrects the time information assigned to the node $Node_4$ corresponding to the boundary between the words "yoi" and "tenki" on the basis of the determined word boundary.

That is, the reevaluation unit 15 determines word boundary between words in the partial word series using the dynamic programming method and corrects the word connection information stored in the word connection information storage unit 16 one by one. The corrected word connection information is referred to by the preliminary word selector 13 and the matching unit 14 when they perform the processing, and thus the accuracy and the reliability of processing are improved.

Furthermore, because the correction of the word boundaries described in the word connection information is performed by the reevaluation unit 15, the number of candidate word boundaries stored as word connection information can be greatly reduced, and thus an improvement in the efficiency of use of the memory space is achieved.

Figure 2:
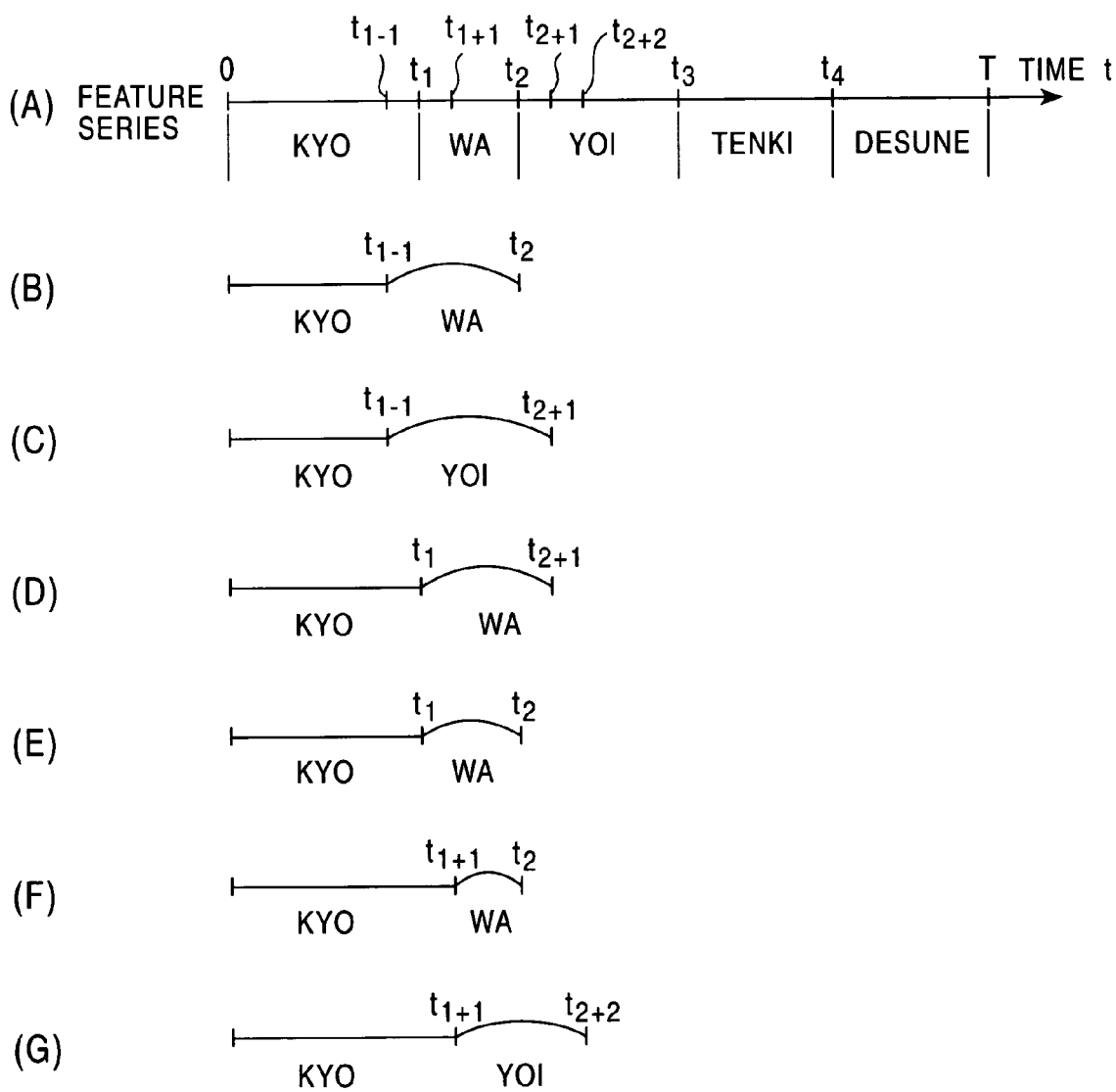
FIG. 2 is a diagram illustrating the necessity of retaining candidates for boundaries between words.

In the conventional technique, as described earlier with reference to FIG. 2, it is needed to retain three times $t_{1-1}$, $t_1$, $t_{1+1}$ as candidates for the word boundary between words "kyo" and "wa". Besides, if the time $t_1$ corresponding to the correct word boundary is not captured and not retained, an adverse effect occurs in the matching process performed subsequently. In contrast, in the present technique in which word boundaries are corrected one by one by the reevaluation unit 15, even in a case where only a time $t_{i-1}$ corresponding to a wrong word boundary is retained, the time $t_{i-1}$ corresponding to the wrong word boundary is corrected by the reevaluation unit 15 to a time $t_i$ corresponding to the correct word boundary, and thus no adverse effect occurs in the matching process performed subsequently.

When the reevaluation unit 15 calculates the acoustic scores and the language scores of words included in a partial word series, the cross-word model is used in the calculations so that preceding and succeeding words are taken into account in the calculation, except for the calculation for the first and last words in the partial series, and thus the processing can be performed with high accuracy.

When the correction of the word connection information stored in the word connection information storage unit 16 is completed, the reevaluation unit 15 informs the matching unit 14 via the control unit 11 of the completion of the correction.

In the matching unit 14, after receiving the matching command from the control unit 11, if the notification of the completion of the correction of the word connection information is received from the reevaluation unit 15 via the control unit 11, the matching unit 14 supplies data representing the node of interest and associated time information to the preliminary word selector 13 and issues a preliminary word selection request to the preliminary word selector 13. Thereafter, the process proceeds to step S5.

In step S5, if the preliminary word selector 13 receives the preliminary word selection request from the matching unit 14, the preliminary word selector 13 performs a preliminary word selection process in which a candidate for a word corresponding to an arc to be connected to the node of interest is selected from the words registered in the dictionary of the dictionary database 18A.

More specifically, the preliminary word selector 13 detects, from the time information assigned to the node of interest, the start time of a series of feature values to be used in the calculation of the language scores and the acoustic scores, and the preliminary word selector 13 reads a necessary series of feature values starting from the detected start time from the feature value storage unit 12. Furthermore, the preliminary word selector 13 creates a word model of each word by connecting the acoustic model described in the acoustic model database 17A to the words registered in the word dictionary of the dictionary database 18A, and the preliminary word selector 13 calculates the acoustic scores using the series of feature values read from the feature value storage unit 12 on the basis of the word models.

The preliminary word selector 13 also calculates the language scores for the words corresponding to the respective word models on the basis of the grammar stored in the grammar database 19A. That is, the preliminary word selector 13 determines the language score of each word on the basis of, for example, a unigram.

Alternatively, the preliminary word selector 13 may calculate the acoustic score of each word on the basis of a cross-word model taking into account an immediately preceding word (corresponding to the arc whose end node is presently of interest), by referring to the word connection information.

Still alternatively, the preliminary word selector 13 may also calculate the acoustic score of each word on the basis of a bigram defining the probability that the word is concatenated with the immediately preceding word, by referring to the word connection information.

After determining the acoustic score and the language score for each word in the above-described manner, the preliminary word selector 13 determines the total score from the acoustic score and the language score (hereinafter, such a total score will be referred to as a word score) and selects L highest-scored words as words to be subjected to the matching process. The selected L words are supplied to the matching unit 14.

Although in the present embodiment, the preliminary word selector 13 selects words on the basis of the overall scores determined from the acoustic scores and the languages scores of the respective words, the preliminary word selector 13 may select words, for example, on the basis of only the acoustic scores or only the language scores.

Alternatively, the preliminary word selector 13 may select words such that from the beginning part of the series of feature values read from the feature value storage unit 12, some phonemes at the beginning of the word are determined on the basis of the acoustic model stored in the acoustic model database 17A, and then a word, whose beginning part has phonemes equal to the phonemes determined above, is selected.

Still alternatively, the preliminary word selector 13 may select words such that the part of speech of the immediately preceding word (corresponding to the arc whose end node is currently of interest) is determined by referring to the word connection information, and words are selected which have a part of speech having a high probability of being located after the part of speech determined above.

That is, the preliminary word selector 13 may employ any method to select words, and may employ even an method of randomly selecting words.

If the matching unit 14 receives L words to be subjected to the matching process (hereinafter, such words will be referred to selected words) from the preliminary word selector 13, the matching unit 14 performs, in step S6, the matching process on the selected words.

More specifically, the matching unit 14 detects, from the time information assigned to the node of interest, the start time of the series of feature values to be used in the calculation of the language scores and the acoustic scores, and the matching unit 14 reads the necessary series of feature values starting from the detected start time from the feature value storage unit 12. The matching unit 14 then detects pronunciation information of the selected words supplied from the preliminary word selector 13 by referring to the dictionary database 18B. The matching unit 14 then reads the acoustic models corresponding to the detected pronunciation information from the acoustic model database 17B and connects them to the selected word thereby creating the word models.

On the basis of the word models created in the above-described manner, the matching unit 14 calculates the acoustic scores for the selected words supplied from the preliminary word selector 13 using the series of feature values read from the feature value storage unit 12. The matching unit 14 may calculate the acoustic scores of the words on the basis of the cross-word models by referring to the word connection information.

The matching unit 14 further calculates the language scores of the selected words supplied from the preliminary word selector 13 by referring to the grammar database 19B. More specifically, the matching unit 14 refers to the word connection information and calculates the language scores of the respective selected words supplied from the preliminary word selector 13 on the basis of the probability defined in a bigram taking into account a word immediately preceding each selected word or on the basis of the probability defined in a trigram taking into account a word immediately preceding each selected word and a word preceding that.

After the matching unit 14 has completed the calculation of the acoustic scores and the language scores for all L selected words supplied from the preliminary word selector 13, the process proceeds to step S7. In step S7, the word score indicating the overall score of each selected word is determined on the basis of the acoustic score and the language score of the word. In accordance with the determined word scores, the word connection information stored in the word connection information storage unit 16 is updated.

More specifically, in step S7, the matching unit 14 determines the word scores for the respective selected words, and compares the word scores with a predetermined threshold value thereby limiting candidate words corresponding to an arc to be connected to the node of interest. The matching unit 14 supplies the words remaining after the above limiting process, together with the acoustic scores, the language scores, and the end time of the respective words, to the control unit 11.

In the above process, the end time of each word is extracted by the matching unit 14 from the extraction times of the feature values used in the calculation of the acoustic scores. In a case where a plurality of extraction times are obtained which are likely to be the end time of a certain word, the plurality of end times of that words are supplied together with the acoustic score and the language score thereof to the control unit 11.

Upon receiving the acoustic scores, the language scores, and the end times from the matching unit 14, the control unit 11 connects arcs corresponding to the respective words supplied from the matching unit 14 to the node of interest in the word connection information (FIG. 4) stored in the word connection information storage unit 16 such that the arcs extend starting from the node of interest and they end at the respective end nodes corresponding to the end times. Furthermore, the control unit 11 assigns the corresponding words, acoustic scores, and language scores to the respective arcs, and assigns the corresponding end times as time information to the end nodes of the respective arcs. Thereafter, the process returns to step S2 and the above-described process is repeated.

As described above, the word connection information is updated one by one in accordance with the result of the process performed by the matching unit 14 and corrected one by one by the reevaluation unit 15, and thus the preliminary word selector 13 and the matching unit 14 can always use the word connection information in the processing.

When the word connection information is updated, the control unit 11 commonizes end nodes in the above-described manner, if possible.

In the case where it is determined in step S2 that there is no intermediate node, the process jumps to step S8. In step S8, the control unit 11 refers to the word connection information and calculates the cumulative sum of the word scores for each path described in the word connection information thereby determining the overall score for each path. A path having the highest overall score is selected, and a series of words corresponding to arcs forming the selected path is output as a recognition result for the speech uttered by the user. Thus, the process is completed.

As described above, the preliminary word selector 13 selects one or more words to be connected after words which have already been determined to be included in word series as candidates for the speech recognition result. The matching unit 14 then calculates the scores for the selected words and forms, on the basis of the calculated scores, series of words to be employed as candidates for the speech recognition result. The reevaluation unit 15 corrects the connections between words in the word series to be employed as the candidates for the speech recognition result. On the basis of the corrected word connections, the control unit 11 finally determines a series of word as the speech recognition result. Thus, it is possible to perform high-accuracy speech recognition without causing a significant increase in the resource needed in the processing.

That is, the word boundaries described in the word connection information is corrected by the reevaluation unit 15. As a result, the time information assigned to the node of interest becomes more likely to indicate the correct word boundary. A series of feature values starting from the time indicated by this high-accuracy time information is used in the following processes by the preliminary word selector 13 and the matching unit 14. Thus, even if the criterion for word selection performed by the preliminary word selector 13 or the criterion for pruning words performed by the matching unit 14 is made stricter, it is possible to reduce, to an extremely low level, the possibility that a correct word to be included in the speech recognition result is discarded.

If the preliminary word selector 13 employs a stricter criterion for selecting words, the number of words to be processed by the matching unit 14 decreases, and thus the amount of calculation and the memory space needed for the processing performing by the matching unit 14 decrease.

Even in a case where a correct word to be included in a series of words to be output as a speech recognition result is not selected by the preliminary word selector 13 at a time at which that word starts, if the word is selected at a time deviating from the correct time, then the reevaluation unit 15 corrects that wrong time to the correct time, and thus, it becomes possible to obtain a series of words indicating a correct speech recognition result. That is, even if the preliminary word selector 13 misses a word which should be included in a series of words indicating a correct speech recognition result, the reevaluation unit 15 can take the missed word into a series of words so as to achieve the correct speech recognition result.

That is, the reevaluation unit 15 can correct not only errors of end times detected by the matching unit 14 but also wrong word selections performed by the preliminary word selector 13.

Figure 7:
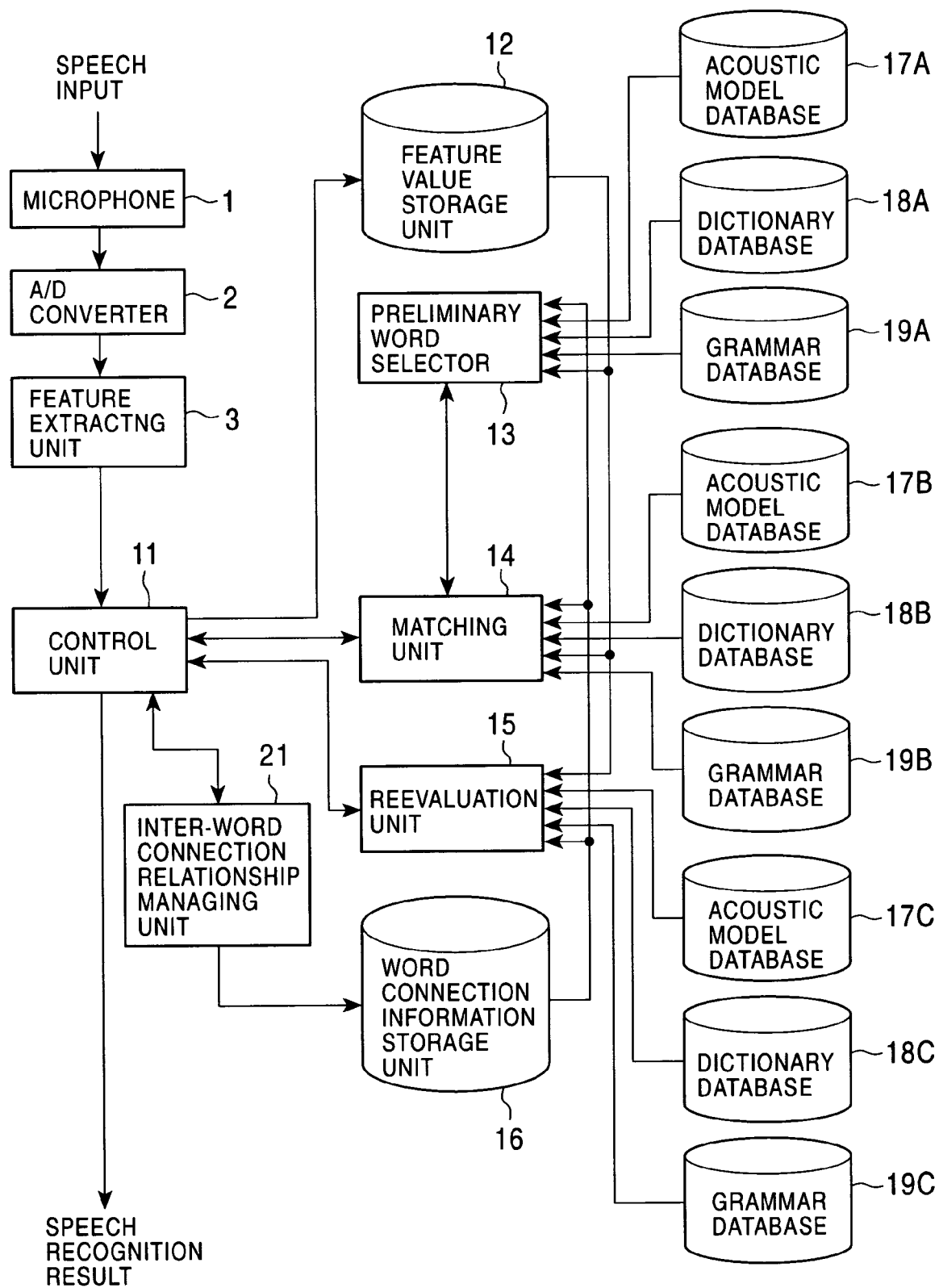
FIG. 7 is a block diagram illustrating a speech recognition apparatus according to a first embodiment of the present invention.

FIG. 7 shows a speech recognition apparatus according to a first embodiment of the present invention. In FIG. 7, similar parts to those in FIG. 3 are denoted by similar reference numerals, and they are not described in further detail herein. The speech recognition apparatus shown in FIG. 7 is basically similar in construction to that shown in FIG. 3 except that a word connection managing unit 21 is disposed between the control unit 11 and the word connection information storage unit 16.

In the embodiment shown in FIG. 7, the control unit 11 produces word connection information on the basis of information supplied from the matching unit 14 and writes the resultant word connection information into the word connection information storage unit 16 via the word connection managing unit 21. In this process, the word connection managing unit 21 limits the locations of the word boundaries represented by the word connection information.

More specifically, if the control unit 11 receives the acoustic scores, the language scores, and the end times from the matching unit 14, the control unit 11 connects arcs corresponding to the respective words supplied from the matching unit 14 to a node of interest in the word connection information (FIG. 4) stored in the word connection information storage unit 16 such that the arcs extend starting from the node of interest and they end at the respective end nodes corresponding to the end times. Furthermore, the control unit 11 assigns the corresponding words, acoustic scores, and language scores to the respective arcs, and assigns the corresponding end times as time information to the end nodes of the respective arcs.

In the above process, the word connection managing unit 21 limits the locations of the end nodes (end times of words) of the arcs extending from the node of interest.

More specifically, for example, as shown in FIG. 8(A), the feature extracting unit 3 extracts feature values at time intervals $T_s$ and supplies the extracted feature values to the control unit 11. The control unit 11 creates word connection information representing arcs corresponding to all words that end at end nodes corresponding to end times in units equal to $T_s$, and writes the resultant word connection information into the word connection information storage unit 16.

For example, in a case where a speech "kyo wa yoi tenki desune" is uttered by a user as shown in FIG. 8(A), if seven candidates for the word boundary between words "kyo" and "wa", i.e., seven candidates for the end time of the word "kyo" are obtained at times (timings) a, b, c, d, e, f, and g which are spaced from each other by the time $T_s$ as shown in FIG. 8(B), then word connection information includes arcs corresponding to the word "kyo" and ending at the end nodes at seven times a to g, respectively.

That is, the boundary between words (i.e., the end time of a word) can be set by the feature extracting unit 3 at times at which the feature values are extracted, and thus the timings of end nodes (hereinafter, referred to as node storage timings) can be set at time intervals $T_s$ as denoted by arrows in FIG. 8(C). As a result, in this specific example, arcs each having end nodes at successive seven times a to g spaced by $T_s$ are stored as the word connection information.

However, it is not desirable to store such a large number of arcs as the word connection information from the standpoint of the storage capacity of the word connection information storage unit 16 and the standpoint of the processing time.

To avoid the above problem, the word connection managing unit 21 limits the locations of the end nodes (end times of words) to timings extracted partially from the timings at which feature values are supplied from the feature extracting unit 3.

For example, the word connection managing unit 21 limits the locations of end nodes to timings at intervals of $3T_s$ as shown in FIG. 8(D).

Herein, the locations (timings) of end nodes limited by the word connection managing unit 21 are referred to as new node storage timings.

In this specific example, when the control unit 11 obtains candidates for the end time of the word "kyo" at seven successive times a to g spaced by $T_s$ as shown in FIG. 8(B), the word connection managing unit 21 limits the locations of end nodes to two times c and f. Thus, the storage capacity of the word connection information storage unit 16 can be reduced. The number of intermediate nodes which will be employed as a node of interest decreases, and thus an increase in the processing speed is achieved.

Figure 8:
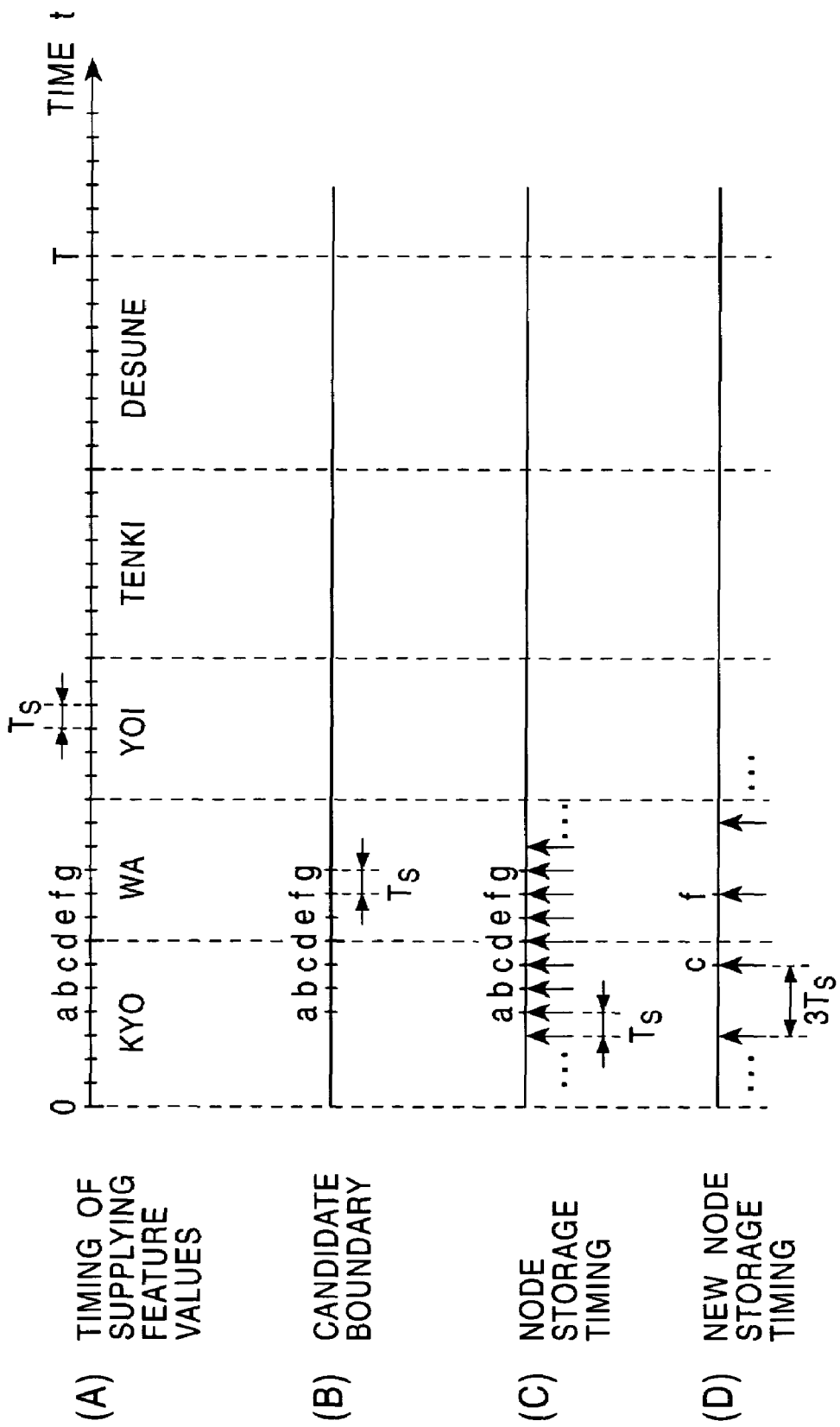
FIG. 8 is a diagram illustrating a process performed by a word connection managing unit 21.

If the locations of the end nodes are limited by the word connection managing unit 21, a correct word boundary is not always obtained. In the case of the specific example shown in FIG. 8, although the correct word boundary between "kyo" and "wa" is at a time d as shown in FIG. 8(A), any of end nodes obtained at the times c and f as shown in FIG. 8(D) is not at the correct time d.

Therefore, if the following process is performed regarding the wrong boundary location at time c or f as the correct boundary location, a reduction in the recognition rate occurs.

In the speech recognition apparatus shown in FIG. 7, the above problem is avoided because, as with the speech recognition apparatus shown in FIG. 3, the reevaluation unit 15 corrects the word boundaries described in the word connection information. That is, the deviation of the word boundary from the correct location can be corrected if the deviation is within an allowable range. Thus, the limitation of the end node locations within the allowable range does not result in a reduction in the recognition performance.

FIG. 9 shows a result of simulation of the speech recognition process performed under the condition in which the locations of end nodes are limited.

In FIG. 9, the row of "TIME INTERVAL" represents the constraint imposed on the locations of end nodes, wherein the numerals described in the row of "TIME INTERVAL" indicates the length of the unit interval expressed by a relative value with respect to the length of the interval $T_s$ at which feature values are supplied from the feature extracting unit 3. Thus, the values described in the row of "TIME INTERVAL" represent the time intervals at which end nodes are allowed to be located. That is, numerals i described in the row of "TIME INTERVAL" indicate that the locations of end nodes are limited to times of $i \times T_s$. Thus, the numeral i=1 in the row of "TIME INTERVAL" indicates that no limitation is imposed on the locations of end nodes, and the numeral i=2 in the row of "TIME INTERVAL" indicates that the locations of end nodes are limited to times $2T_s$.

The row of "CORRECT WORD RECOGNITION RATE" represents the speech recognition rate.

In this simulation, the time intervals $T_s$ at which feature values are supplied from the feature extracting unit 3 were set to 10 ms.

Furthermore, in this simulation, the number of recognizable words were set to 20,000, and recognition was performed for 20 speeches uttered by each of 10 persons, i.e., for a total of 200 speeches. A trigram grammar was used.

As can be seen from the simulation result shown in FIG. 9, similar good recognition performance is obtained if the locations of end nodes are limited to times at intervals $T_s$ to $4T_s$.

Because the number of speech utterances recognized in this simulation is as small as 200, differences of 0.5% to 1% in recognition rate described in the row of "CORRECT WORD RECOGNITION RATE" can be ignored.

Figure 10:
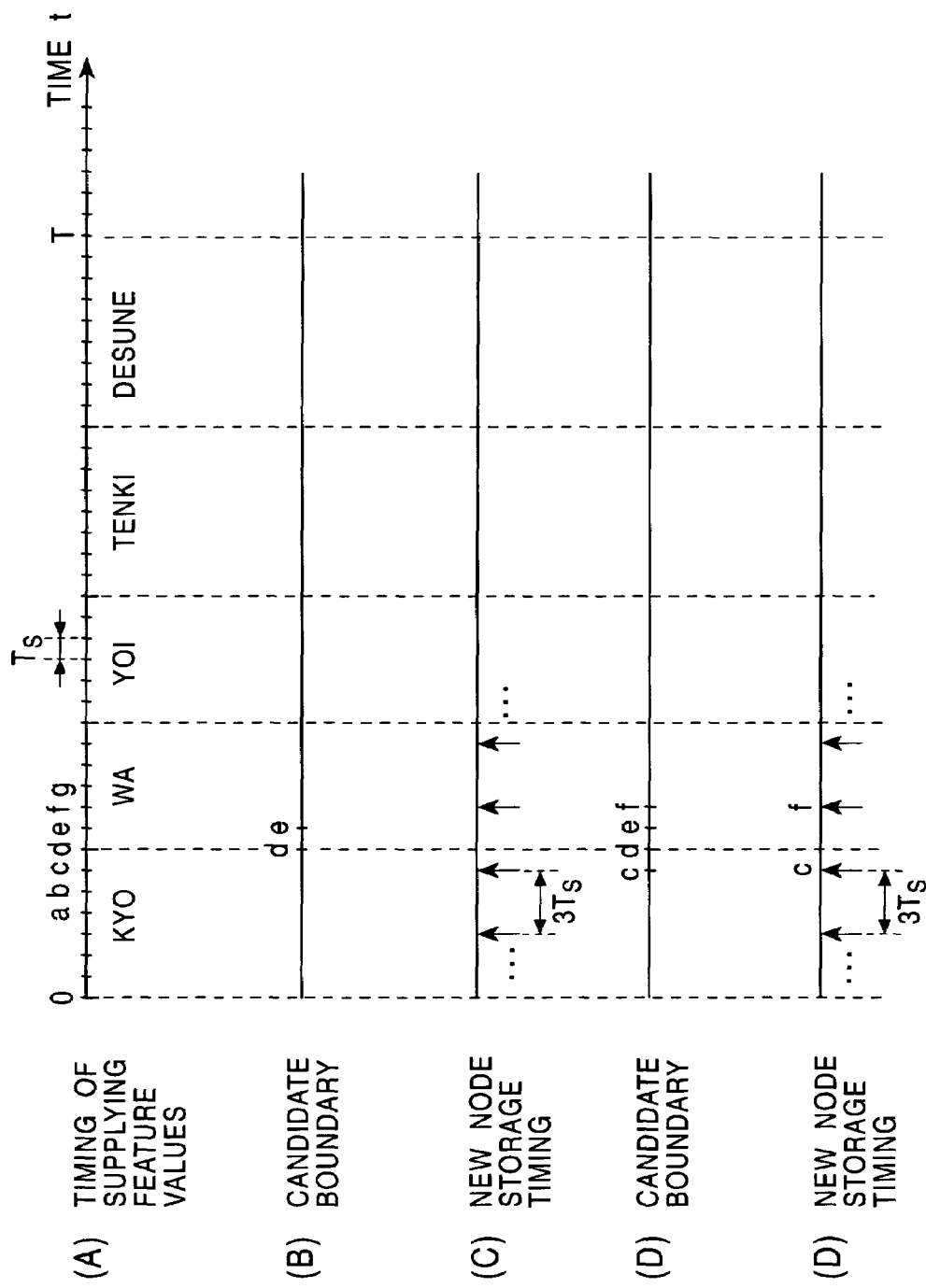
FIG. 10 is a diagram illustrating an effect obtained by correcting word scores.

In an example shown in FIG. 10(A), a speech of "kyo wa yoi tenki desune" is uttered as in the example shown in FIG. 8(A), and candidates for the boundary between words "kyo" and "wa", i.e., candidates for the end time of the word "kyo" are obtained at successive two times (timings) d and e spaced by $T_s$ as shown in FIG. 10(B).

That is, the matching unit 14 calculates the word scores of the word "kyo" for the respective end times a to g spaced by $T_s$ shown in FIG. 10(A), and the times d and e survive as the candidates for the end time of the word "kyo" after the pruning performed on the basis of the calculated word scores.

In this case, if the word connection managing unit 21 limits the locations of end nodes to timings at intervals of $3T_s$ as shown in FIG. 10(C), the times d and e are not at any of the limited timings, i.e., they are not at any of the new storage timings, and thus arcs ending at the time d and e are not stored in the word connection information storage unit 16.

In this example, although the candidates for the end time of the word "kyo" are obtained at the correct time d and the time e close thereto in FIG. 10(B), the nodes at these times are not stored.

If an end node close to the correct end time is not stored as in this specific example, it is difficult for the reevaluation unit 15 to correct the location of the boundary between words to a right location, and thus degradation in speech recognition performance occurs.

To avoid the above problem, the control unit 11 controls the matching unit 14 to correct the word scores calculated by the matching unit 14 and tentatively determines (prunes) candidates for the boundary locations of words included in series of words to be employed as candidates for the speech recognition result.

Herein, let A(x) and L(x) represent the acoustic score and the language score of a word having an end time of x, and let $x_{-1}$ and $x_{+1}$ represent times immediately preceding and following the time x. The matching unit 14 determines an acoustic score A' (x) and a language score L' (x) used to determine a corrected word score of a word ending at time x (hereinafter, A' (x) and L' (x) will be referred to as a corrected acoustic score and a corrected language score, respectively) in accordance with the following equation:

$$A'(x) = \max\{A(x_{-1}), A(x), A(x_{+1})\}$$

$$L'(x) = \max\{L(x_{-1}), L(x), L(x_{+1})\} \quad (2)$$

where max{} denotes the maximum value of those within braces {}.

In equation (2), the acoustic scores $A(x_{-1})$, $A(x)$, and $A(x_{+1})$ are normalized so that they do not depend on the length of time over which each acoustic score is calculated.

According to equation (2), the acoustic score of a word ending at a certain time x is corrected by replacing it with the greatest acoustic score of those at the times x, $x_{-1}$ immediately preceding x, and $x_{+1}$ immediately following x, and the language score is also corrected in a similar manner. As a result, the word score of a word ending at a certain time x is replaced with the highest word score of the word scores of words ending at times within a narrow range centered at the time x.

Thus, the word "kyo" ending at the time d and the word "kyo" ending at the time e can survive, as shown in FIG. 10(B), through the pruning performed on the basis of the uncorrected word scores when the words "kyo" ending at the times d and e have word scores higher than the predetermined threshold value and the word scores of the word "kyo" ending at the other times are lower than the predetermined threshold value. This means that the word score of the word "kyo" ending at the time c immediately preceding the time d is lower than the word score of the word "kyo" ending at the time d, and the word score of the word "kyo" ending at the time f immediately following the time e is lower than the word score of the word "kyo" ending at the time e.

Therefore, the word score of the word "kyo" ending at the time c is replaced with the word score of the word "kyo" ending at the time d immediately following the time c. Similarly, the word score of the word "kyo" ending at the time f is replaced with the word score of the word "kyo" ending at the time e immediately preceding the time f.

As a result, the corrected word scores of the words "kyo" ending at the times c and f both become higher than the predetermined threshold value. If the pruning is performed on the basis of the corrected scores, not only the words "kyo" ending at the times d and e but also the words "kyo" ending at the times c and f remain as shown in FIG. 10(D).

In this case, if the word connection managing unit 21 limits the locations of end nodes to those at intervals of $3T_s$ as shown in FIG. 10(E) in a similar manner to FIG. 10(C), the words "kyo" ending at the times c and f close to the correct time d remain, and nodes at the times c and f are stored.

Because the nodes at times c and f close to the correct time d are stored, the reevaluation unit 15 can successfully correct the location of the boundary between words to the right location.

Figure 11:
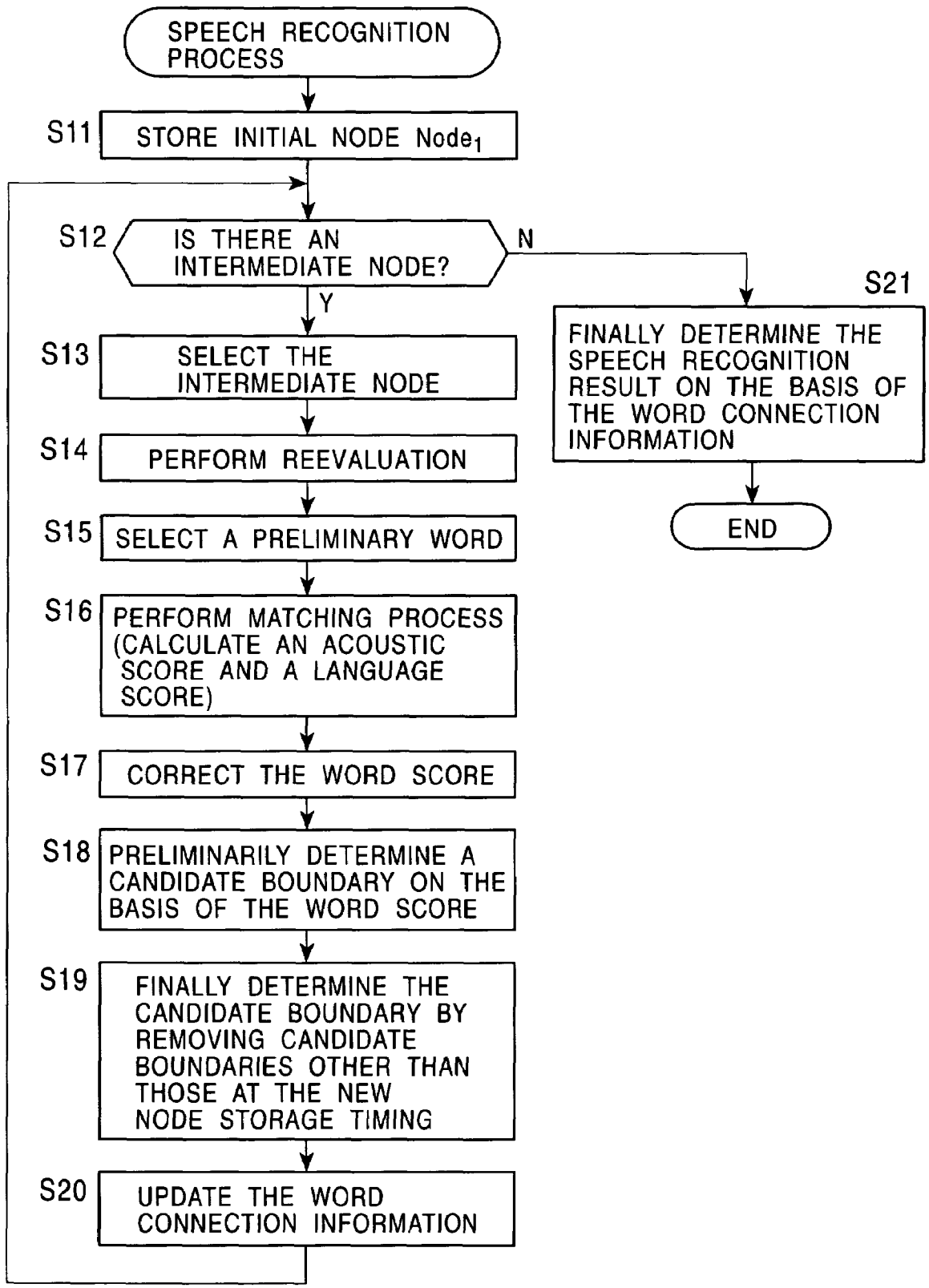
FIG. 11 is a flow chart illustrating a speech recognition process performed by the speech recognition apparatus shown in FIG. 7.

Referring to a flow chart shown in FIG. 11, the speech recognition process performed by the speech recognition apparatus shown in FIG. 7 is described below.

Figure 5:
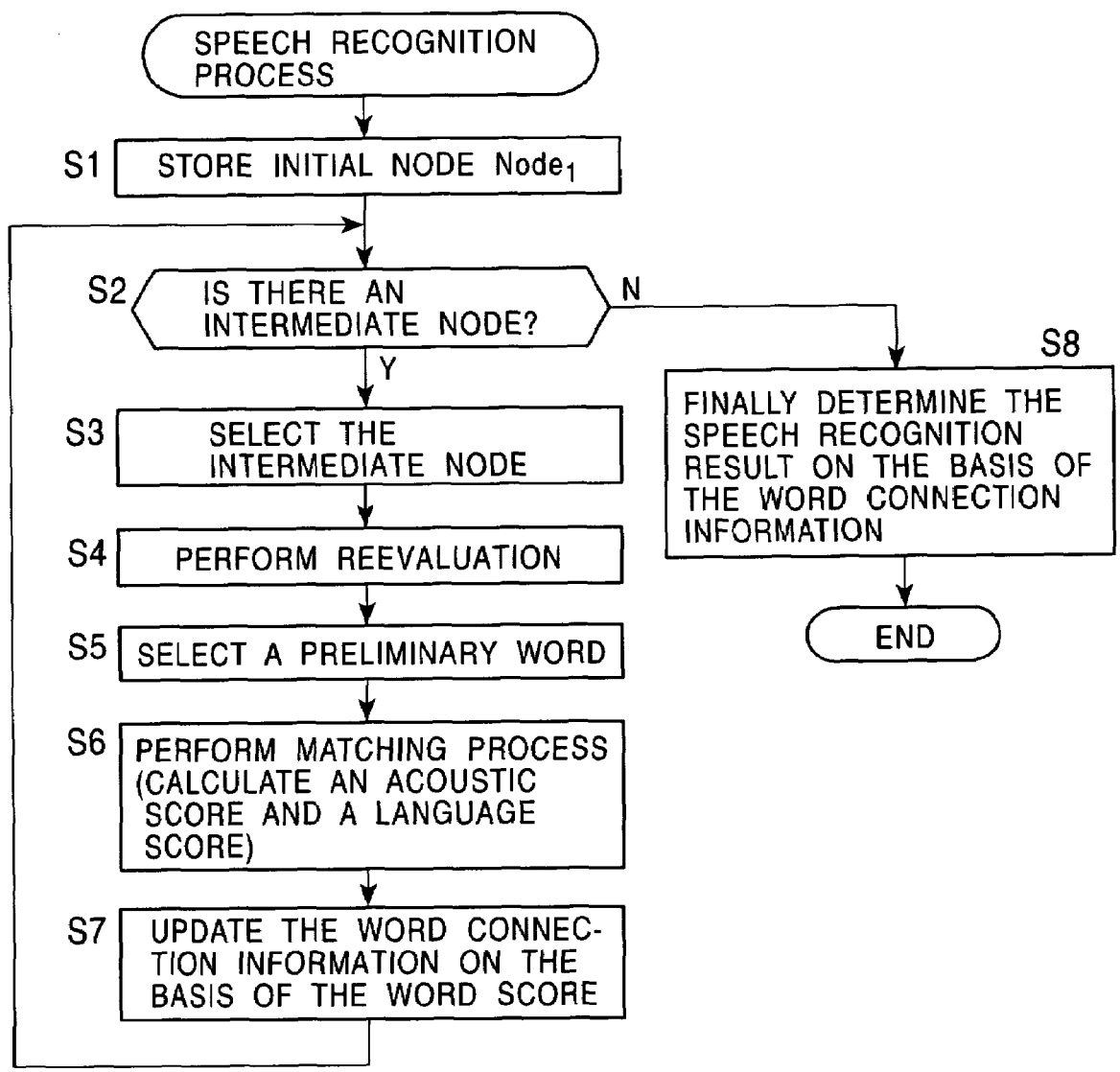
FIG. 5 is a flow chart illustrating a process performed by the speech recognition apparatus shown in FIG. 3.

In the process performed by the speech recognition apparatus shown in FIG. 7, steps S11 to S16 are similar to steps S1 to S6 shown in FIG. 5.

In step S16, the matching unit 14 calculates the acoustic scores and the language scores for all selected words supplied from the preliminary word selector 13 in a similar manner to step S6 shown in FIG. 5. In the next step S17, the matching unit 14 corrects the acoustic scores and the language scores of the respective words by replacing them with the acoustic scores and the language scores of the same word ending at different times in accordance with equation (2). Furthermore, the matching unit 14 calculates the corrected word scores from the corrected acoustic scores and the corrected language scores. In the next step S18, the matching unit 14 prunes the words on the basis of the corrected word scores and determines (tentatively) candidates for the locations of boundaries of words without limiting the locations.

Thereafter, the matching unit 14 supplies the words remaining after the pruning in step S18 to the control unit 11 together with the acoustic scores, the language scores, and the end times of the words.

If the control unit 11 receives the acoustic scores, the language scores, and the end times of words from the matching unit 14, the control unit 11 supplies the end times of the respective words to the word connection managing unit 21.

In the next step S19, the word connection managing unit 21 limits the end times given as candidates for the word boundaries to the new node storage timings. That is, the end times which are not at any of new node storage timing locations are discarded, and the remaining end points are employed as final candidates for the word boundaries. The word connection managing unit 21 returns the finally remaining end times to the control unit 11. In step S20, the control unit 11 updates, via the word connection managing unit 21, the word connection information stored in the word connection information storage unit 16, for the words whose end time has been returned from the word connection managing unit 21.

That is, in step S20, as in step S7 shown in FIG. 5, arcs corresponding to the respective words whose end time has been returned from the word connection managing unit 21 are connected to the node of interest in the word connection information (FIG. 4) stored in the word connection information storage unit 16 such that the arcs extend starting from the node of interest and they end at the end nodes corresponding to the respective end times. Furthermore, the control unit 11 assigns the corresponding words, acoustic scores, and language scores to the respective arcs, and assigns the corresponding end times as time information to the end nodes of the respective arcs.

Thereafter, the process returns to step S12 and the above-described process is repeated.

In the case where it is determined in step S12 that there is no intermediate node, the process jumps to step S21. In step S21, as in step S8 shown in FIG. 5, the control unit 11 refers to the word connection information and calculates the cumulative sum of the word scores for each path described in the word connection information thereby determining the overall score for each path. A path having the highest overall score is selected, and a series of words corresponding to arcs forming the selected path is output as a recognition result for the speech uttered by the user. Thus, the process is completed.

As described above, the word connection managing unit 21 limits the locations of end nodes to timings (new node storage timings) extracted partially from the timings at which the feature values are supplied from the feature extracting unit 3, thereby making it possible to reduce the storage capacity of the word connection information storage unit 16 and the processing time and also making it possible to improve the efficiency of processing.

The limiting the locations of end nodes does not cause degradation in the recognition performance, because the locations of end nodes are corrected by the reevaluation unit 15 to right locations of word boundaries. Although in the embodiment shown in FIG. 7, the speech recognition apparatus includes the preliminary word selector 13, the speech recognition apparatus may not include the preliminary word selector 13.

Figure 12:
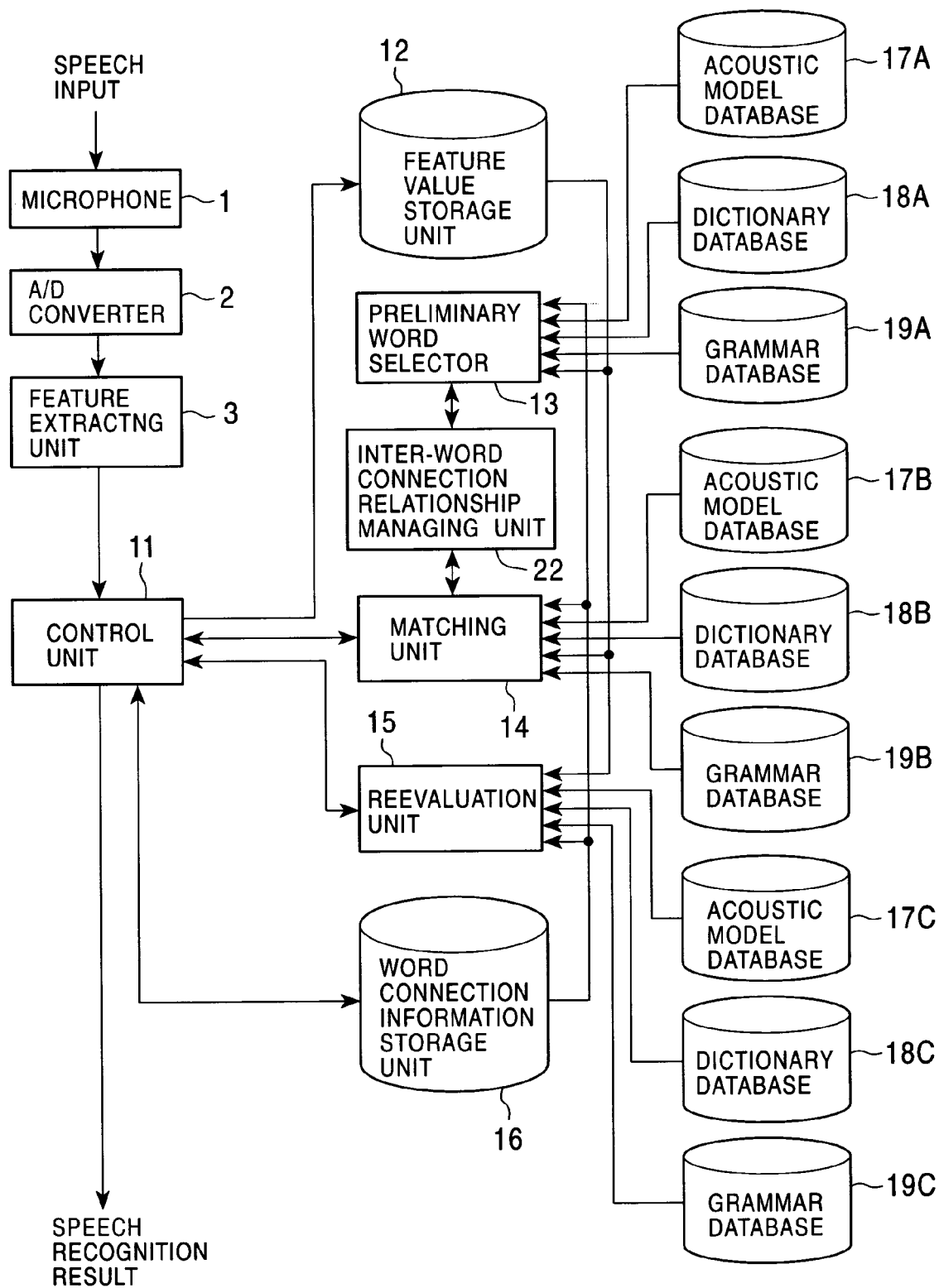
FIG. 12 is a block diagram illustrating a speech recognition apparatus according to a second embodiment of the present invention.

FIG. 12 shows a speech recognition apparatus according to a second embodiment of the present invention. In FIG. 12, similar parts to those in FIG. 3 are denoted by similar reference numerals, and they are not described in further detail herein. The speech recognition apparatus shown in FIG. 12 is basically similar in construction to that shown in FIG. 3 except that a word connection managing unit 22 is disposed between the preliminary word selector 13 and the matching unit 14.

In the embodiment shown in FIG. 12, a preliminary word selection request output from the matching unit 14 are supplied, together with a node of interest and associated time information, to the preliminary word selector 13 via the word connection managing unit 22. In this process, the word connection managing unit 22 limits the time information of the node of interest supplied from the matching unit 14, i.e., the start locations (start times) of the selected words.

Figure 13:
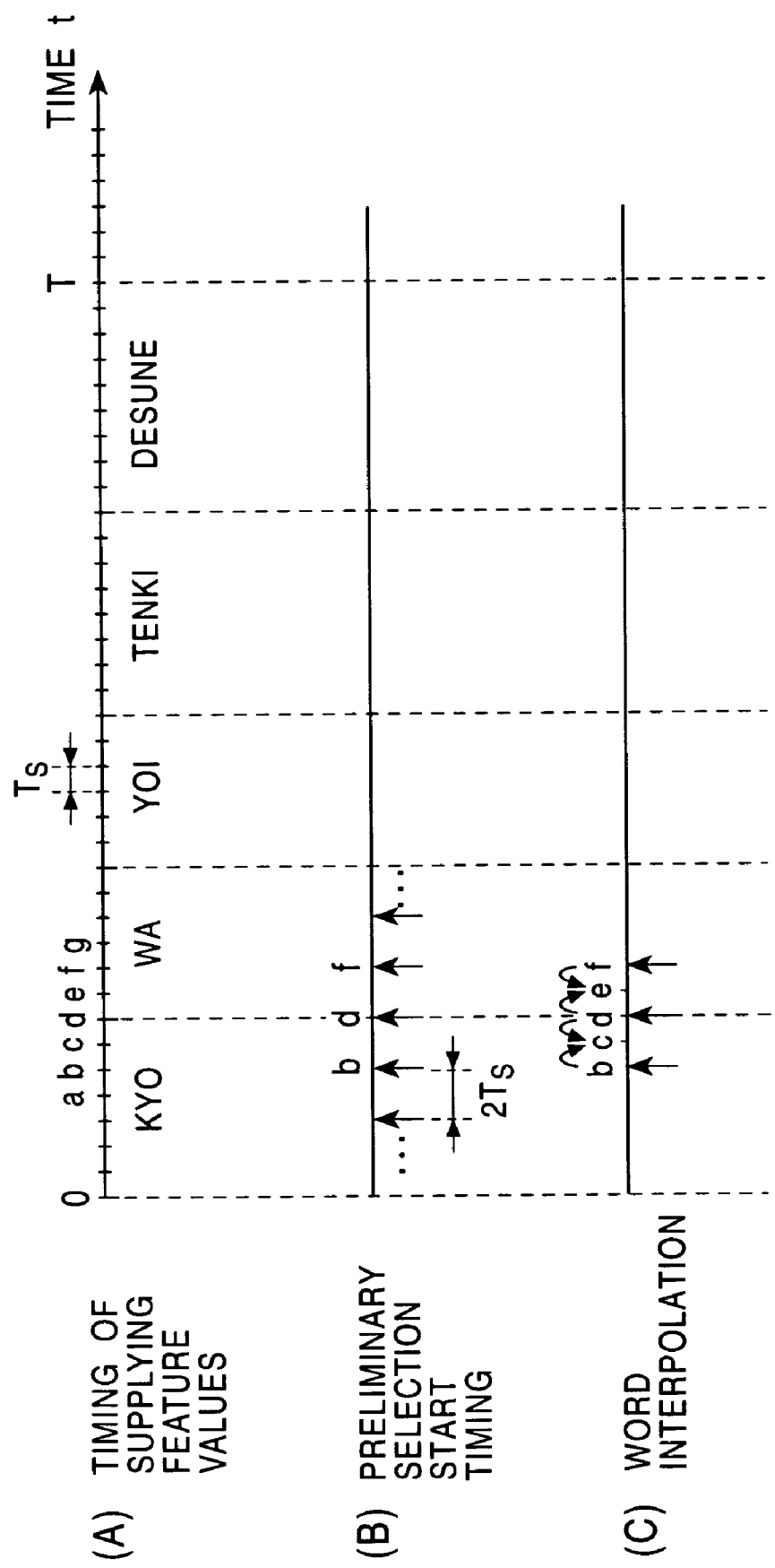
FIG. 13 is a diagram illustrating a process performed by a word connection managing unit 22.

For example, if feature values are extracted at time intervals of $T_s$ by the feature extracting unit 3 as shown in FIG. 13(A) and supplied to the control unit 11, the control unit 11 creates word connection information representing arcs corresponding to all words that end at end nodes corresponding to end times in units equal to $T_s$, and writes the resultant word connection information into the word connection information storage unit 16.

For example, in a case where a speech "kyo wa yoi tenki desune" is uttered by a user as shown in FIG. 13(A), if seven candidates for the word boundary between words "kyo" and "wa", i.e., seven candidates for the end time of the word "kyo" are obtained at times a, b, c, d, e, f, and g which are spaced from each other by the time $T_s$ as shown in FIG. 8(B), then the end nodes at these seven times a to g are stored into the word connection information storage unit 16.

As a result, these seven end nodes a to g are selected one by one as a node of interest, and the preliminary word selector 13 preliminarily selects words having a start location at the node of interest selected from these seven end nodes a to g.

However, it is undesirable to perform the preliminary word selection for a large number of start locations at different times, from the standpoint of the processing time.

In view of the above, the word connection managing unit 22 limits the locations of the nodes of interest supplied from the matching unit 14 to the preliminary word selector 13 to the timings extracted partially from the timings at which the feature values are supplied from the feature extracting unit 3.

For example, the word connection managing unit 22 limits the locations of nodes of interest to timings at intervals of $2T_s$ as shown in FIG. 13(B). As a result, the start timings of the preliminary word selection process performed by the preliminary word selector 13 (start times of words) are limited to times at intervals of $2T_s$.

More specifically, if the location of a node of interest supplied from the matching unit 14 is coincident with one of locations allowed as staring times of words (hereinafter, such locations will be referred to as allowed locations), the word connection managing unit 22 directly supplies the node of interest to the preliminary word selector 13. However, if the node of interest supplied from the matching unit 14 is at a location which is not allowed as a staring time of a word (hereinafter, such a location will be referred to as an inhibited location), the word connection managing unit 22 temporarily retains the node of interest without supplying it to the preliminary word selector 13.

This causes the preliminary word selector 13 to select only preliminary words having a start location coincident with one of the allowed locations. As a result, the processing time needed to perform the preliminary word selection is reduced.

In the case where the preliminary word selector 13 selects only preliminary words having a start location coincident with one of the allowed locations, the resultant preliminary words do not include a word that starts at an inhibited location. As a result, any word starting at an inhibited location is not subjected to the matching process performed by the matching unit 14.

However, because the time information of the nodes of interest output together with the preliminary word selection request from the matching unit 14 has times at intervals of $T_s$, there is a possibility that the preliminary word selector 13 is requested by the matching unit 14 to select preliminary words including not only those starting at allowed locations but also those starting at inhibited locations.

Thus, if any word starting at an inhibited location is not supplied as a preliminarily selected word to the matching unit 14, and thus if any such word is not subjected to the matching process, the result is degradation in the recognition performance.

In view of the above, if the word connection managing unit 22 is requested by the matching unit 14 to select a preliminary word starting at an inhibited location, the word connection managing unit 22 supplements the preliminarily selected words with a word starting at an inhibited location and supplies the resultant selected preliminary words including the supplemental word to the matching unit 14.

More specifically, for example, in a situation in which, of times a to g at intervals of $T_s$ shown in FIG. 13(A), only times b, d, and f at intervals of $2T_s$ shown in FIG. 13(B) are allowed by the word connection managing unit 22 for the start timings (start times) of words to be preliminarily selected, if the word connection managing unit 22 is requested to select a preliminary word starting at a time (inhibited location) c or e other than the above allowed times, a word (a selected word) starting at a time close to the time c or e obtained via the preliminary word selection process is interpolated at the inhibited time c or e.

More specifically, for example, as for the inhibited time c, as shown in FIG. 13(C), the word connection managing unit 22 interpolates, at the time c, a set of words starting at an allowed time b or d immediately preceding or following the inhibited time c, obtained via the preliminary word selection process, and the word connection managing unit 22 supplies the resultant words to the matching unit 14. As for the inhibited time e, as shown in FIG. 13(C), the word connection managing unit 22 interpolates, at the time e, a set of words starting at an allowed time d or f immediately preceding or following the inhibited time e, obtained via the preliminary word selection process, and the word connection managing unit 22 supplies the resultant words to the matching unit 14.

As described above, when the preliminary word selector 13 selects any preliminary word in the above process, the word is always selected from those having an allowed starting time. However, the matching unit 14 can receives not only preliminarily selected words starting at allowed times but also interpolated supplemental words starting at inhibited times. This allows a reduction in cost needed to perform the preliminary word selection without causing degradation in recognition performance.

As described above, in order to make it possible to interpolate a word starting at an inhibited time in response to a request from the matching unit 14 and incorporate it into the preliminary selected words to supplied to the matching unit 14, the word connection managing unit 22 has to temporarily retain preliminary words starting at allowed times, selected and supplied by the preliminary word selector 13.

In the case where a word to be interpolated at an inhibited time is not included in the preliminarily selected words retained by the word connection managing unit 22, the word connection managing unit 22 requests the preliminary word selector 13 to select a preliminary word starting at an allowed time close to the inhibited time. Upon receiving the preliminary word staring at the allowed time, which is supplied from the preliminary word selector 13 in response to the request, the word connection managing unit 22 interpolates the received word at the inhibited time.

Figure 14:
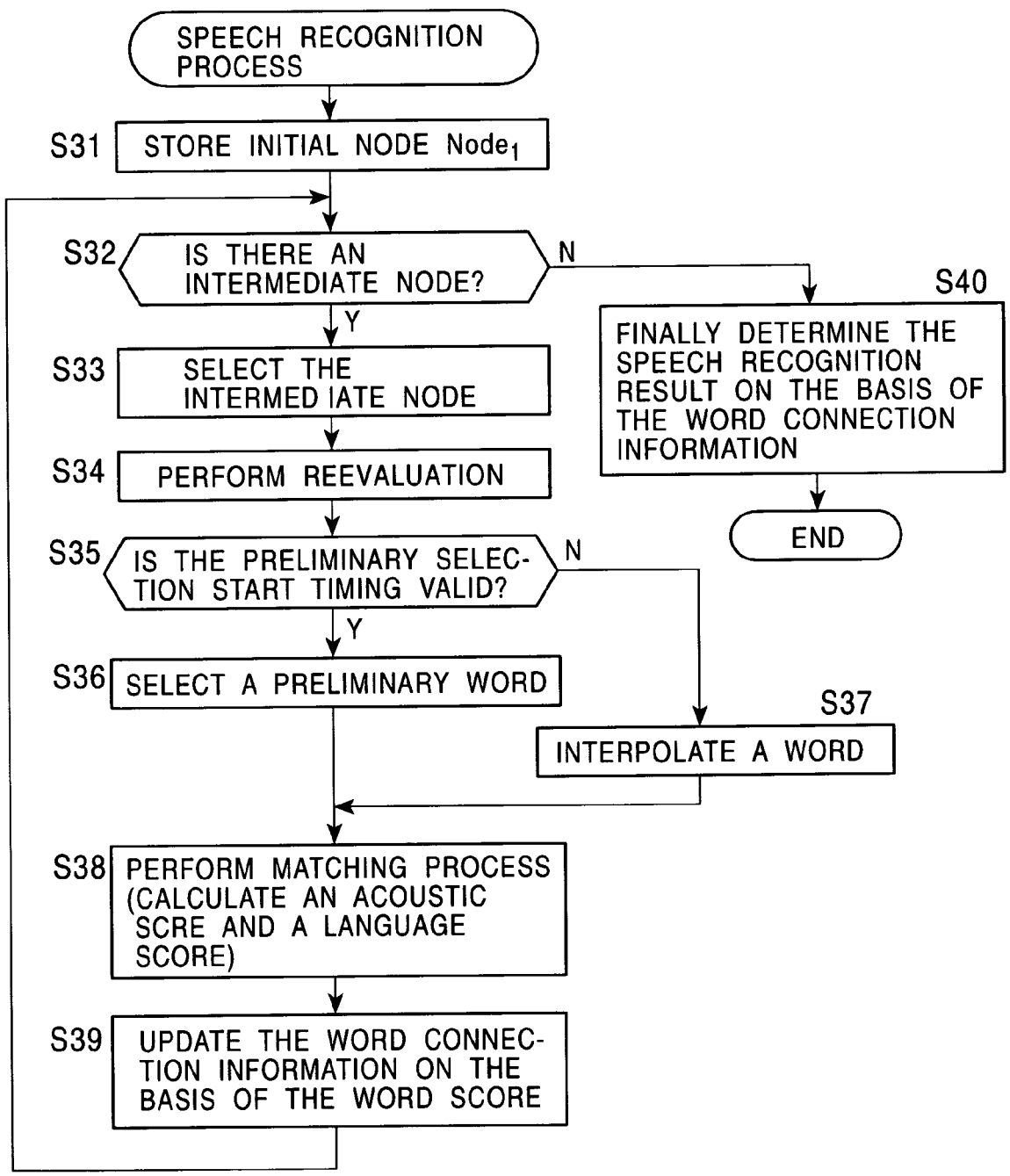
FIG. 14 is a flow chart illustrating a speech recognition process performed by the speech recognition apparatus shown in FIG. 12.

Referring to a flow chart shown in FIG. 14, a speech recognition process performed by the speech recognition apparatus shown in FIG. 12 is described below.

In the process performed by the speech recognition apparatus shown in FIG. 12, steps S31 to S34 are similar to steps S1 to S4 shown in FIG. 5.

In step S34, as in step S4 in FIG. 5, the reevaluation unit 15 corrects the word connection information stored in the word connection information storage unit 16. If the matching unit 14 receives, via the control unit 11, a notification of the completion of the correction, the matching unit 14 outputs a preliminary word selection request together with a node of interest and associated time information.

The preliminary word selection request output from the matching unit 14 together with the node of interest and the associated time information is received by the word connection managing unit 22.

Upon receiving the preliminary word selection request, the word connection managing unit 22 determines, in step S35, whether the preliminary word selection request received from the matching unit 14 specifies that a word starting at an allowed time should be selected. If it is determined in step S35 that the preliminary word selection request specifies that a word starting at an allowed time should be selected, the word connection managing unit 22 transfers the received preliminary word selection request to the preliminary word selector 13. Thereafter, the process proceeds to step S36. In step S36, the preliminary word selector 13 performs the preliminary word selection process in a similar manner as in step S5 in FIG. 5, and the preliminary word selector 13 supplies the obtained words (selected words) to the word connection managing unit 22. The word connection managing unit 22 temporarily retains the selected words (starting at allowed times) supplied from the preliminary word selector 13 and also supplies them as the result of the preliminary word selection to the matching unit 14. Thereafter, the process proceeds to step S38.

On the other hand, in the case where it is determined in step S35 that the preliminary word selection request does not specify that a word starting at an allowed time should be selected but specifies that a word starting at an inhibited time should be selected, the process jumps to step S37. In step S37, The word connection managing unit 22 extracts words starting at allowed times immediately preceding and following the inhibited time from the preliminarily selected words already received from the preliminary word selector 13, and interpolates the extracted words at the inhibited time as a result of the preliminary word selection. The word connection managing unit 22 supplies, to the matching unit 14, the supplemental words interpolated at the inhibited time as the result of the preliminary word selection. Thereafter, the process proceeds to step S38.

Thereafter, steps S38 to S40 are performed in a similar manner as in steps S6 to S8 shown in FIG. 5.

In the embodiment described above, words starting at allowed times immediately preceding and following an inhibited time are selected from preliminary selected words and interpolated at the inhibited time. Alternatively, for example, as shown in FIG. 15(A), words starting at a plurality of allowed times $x_1$, $x_2$, $x_3$, $x_4$, $x_5$, and $x_6$, respectively, within a predetermined range centered at an inhibited time $x_0$ may be selected from the preliminary selected words and interpolated at the inhibited time $x_0$.

In the case where words starting at a plurality of allowed times $x_1$, $x_2$, $x_3$, $x_4$, $x_5$, and $x_6$, respectively, within a predetermined wide range centered at an inhibited time $x_0$ are selected from the preliminary selected words and interpolated at the inhibited time $x_0$, weights may be assigned to respective allowed locations $x_1$ to $x_6$ depending on the distance from the inhibited location, and words may be interpolated at the inhibited location $x_0$ in accordance with the assigned weights.

Figure 15:
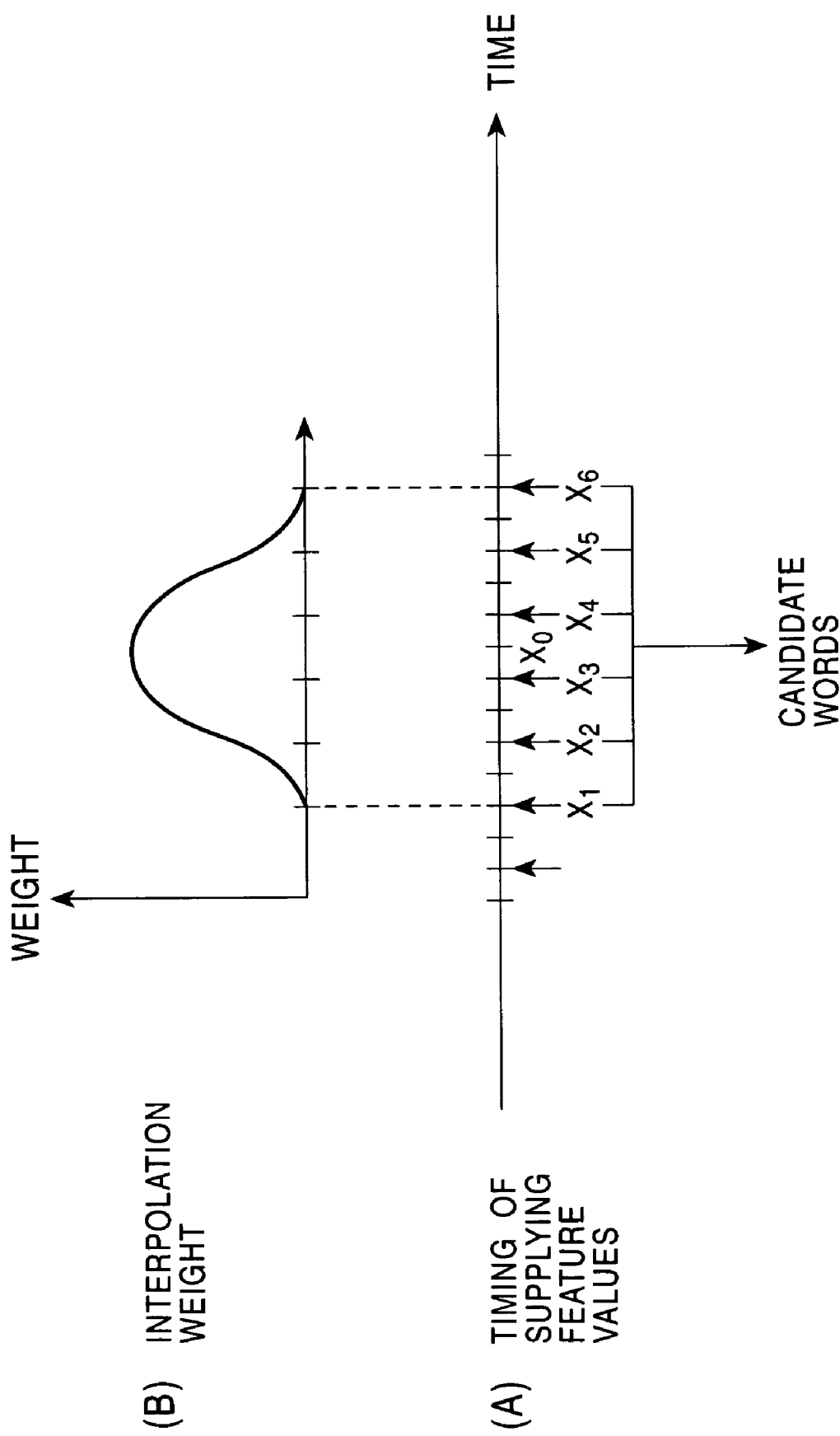
FIG. 15 is a diagram illustrating a method of supplementing the preliminary word selection result with another word.

In this case, for example, as shown in FIG. 15(B), the weight may be reduced with the distance from the inhibited location $x_0$. More specifically, in this case, the number of words employed as interpolation words at the inhibited location $x_0$ increases as the distance becomes closer to the inhibited location $x_0$. For example, a large number of words starting at an allowed location $x_3$ or $x_4$ are employed, but a small number of words staring at distant allowed locations such as $x_1$ or $x_6$ are employed. In the case where weighting is used, all preliminary selected words whose start location is at a certain allowed location are not employed for interpolation, but some of them are employed. Words to be employed for the interpolation may be selected on the basis of, for example, the word scores obtained via the preliminary word selection process. That is, words to be employed for interpolation may be preferentially selected in the order of decreasing word score.

As described above, the starting timings employed in the preliminary word selection are limited to the allowed locations, but, if the preliminary word selection request issued by the matching unit 14 specifies that a word starting at an inhibited location should be selected, words are interpolated at the inhibited locations, thereby making it possible to greatly reduce the complexity of processing without causing degradation in the recognition performance.

In the embodiment shown in FIG. 12 (also in an embodiment described later with reference to FIG. 16), the speech recognition apparatus includes the reevaluation unit 15. However, the speech recognition apparatus may be constructed without including the reevaluation unit 15.

Figure 16:
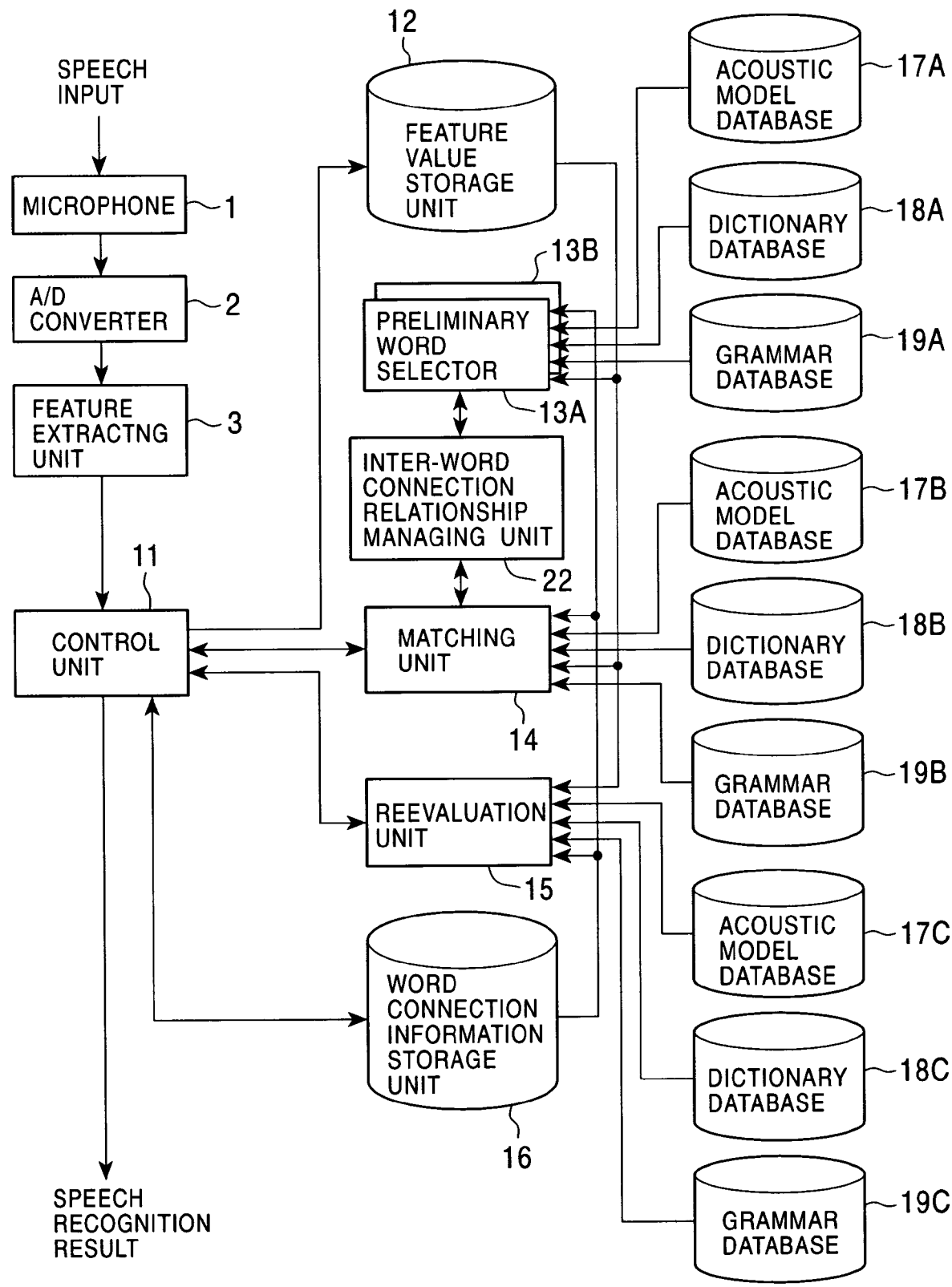
FIG. 16 is a block diagram illustrating a speech recognition apparatus according to a third embodiment of the present invention.

FIG. 16 shows a speech recognition apparatus according to a third embodiment of the present invention. In FIG. 16, similar parts to those in FIG. 12 are denoted by similar reference numerals, and they are not described in further detail herein. The speech recognition apparatus shown in FIG. 16 is basically similar in construction to that shown in FIG. 3 except that the single preliminary word selector 13 is replaced with two preliminary word selectors 13A and 13B.

However, in the embodiment shown in FIG. 16, the words registered in the dictionary database 18A are categorized into two groups: a group of words including large numbers of phonemes; and a group of words including small numbers of phonemes. A preliminary word selector 13A selects preliminary words from the group of words including large numbers of phonemes, while a preliminary word selector 13B selects preliminary words from the group of words including small numbers of phonemes.

The word connection managing unit 22 limits the start timings of words differently depending on whether preliminary words are selected by the preliminary word selector 13A or the preliminary word selector 13B.

More specifically, the word connection managing unit 22 limits the starting timings of the preliminary word selection processing performed by the preliminary word selector 13A to those at relatively long intervals. Conversely, the starting timings of the preliminary word selection process performed by the preliminary word selector 13A are limited to those at relatively short intervals.

In this technique, it becomes possible to prevent a word having a small number of phonemes from being missed in the preliminary word selection process, and the processing efficiency is improved.

More specifically, if the starting timings of the preliminary word selection process are limited to those at long intervals, the cost for the preliminary word selection decreases. However, because words including a small number of phonemes, such as a particle, are generally uttered in a short time, if the starting timings of the preliminary word selection process for such a word are limited to those at long intervals, the deviation of the starting timing of the preliminary word selection process from the start time of a word utterance tends to become great relative to the utterance time of the word. This makes it difficult to detect such a word in the preliminary word selection process. In contrast, in the case of words including large number of phonemes, the utterance time is generally long, and thus even if the starting timings of the preliminary word selection process are limited to those at long intervals, the deviation of the starting timing of the preliminary word selection process from the start time of a word utterance does not become very great relative to the utterance time of the word, and thus it does not become difficult to detect such a word in the preliminary word selection process.

In view of the above, the starting times of the preliminary word selection process for the group of words including small numbers of phonemes are limited to those at short intervals, and the starting times of the preliminary word selection process for the group of words including large numbers of phonemes are limited to those at long intervals, thereby making it possible to improve the processing efficiency and prevent a word having a small number of phonemes from being missed in the preliminary word selection process, without causing degradation in the recognition performance.

Although in the embodiment shown in FIG. 16, the words registered in the dictionary database 18A are categorized into two groups, and the speech recognition apparatus includes two preliminary word selectors 13A and 13B, the number of groups into which words are categorized and the number of preliminary word selectors may be equal to or greater than three.

Furthermore, although in the embodiment shown in FIG. 16, the words are categorized in accordance with the number of phonemes, the words may be categorized in accordance with, for example, the average utterance times of the respective words. Alternatively, the words may be categorized in accordance with the importance, and the starting timings of the preliminary word selection process for a group of words of great importance may be limited to those at short intervals. For example, the importance of words may be determined such that information about the number of occurrences of words or the history of use of words is collected, and the importance of words are determined on the basis of the information.

Figure 17:
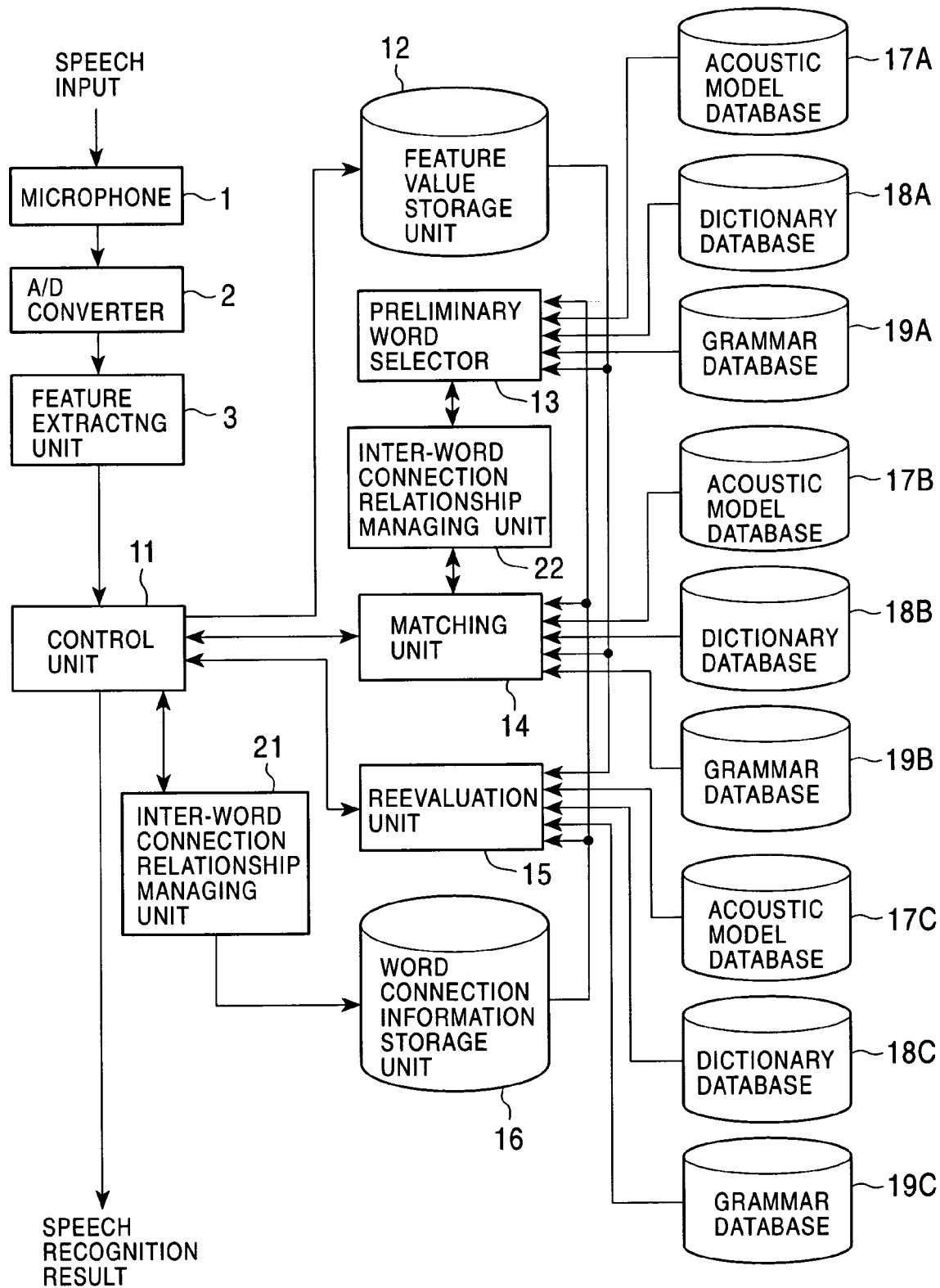
FIG. 17 is a block diagram illustrating a speech recognition apparatus according to a fourth embodiment of the present invention.

FIG. 17 shows a speech recognition apparatus according to a fourth embodiment of the present invention. In FIG. 17, similar parts to those in FIG. 3, 7, or 12 are denoted by similar reference numerals, and they are not described in further detail herein. The speech recognition apparatus shown in FIG. 17 is basically similar in construction to that shown in FIG. 3 except that the speech recognition apparatus further includes a word connection managing unit 21 similar to that shown in FIG. 7 and a word connection managing unit 22 similar to that shown in FIG. 12.

In the embodiment shown in FIG. 17, the word connection managing unit 21 limits the locations of end nodes stored as word connection information, and the word connection managing unit 22 limits the starting timings of the preliminary word selection process.

For example, as shown in FIGS. 8(A) and 18(A), when the feature values are extracted by the feature extracting unit 3 at intervals of $T_s$, the word connection managing unit 21 limits the locations of end nodes to timings at intervals of, for example, $2T_s$ as shown in FIG. 18(B). Furthermore, the word connection managing unit 22 limits the start timings of the preliminary word selection process, for example, to timings at intervals of $4T_s$ as shown in FIG. 18(C).

Because the locations of end nodes are limited by the word connection managing unit 21 to timings at intervals of $2T_s$, the matching unit 14 can issue a request for selection of preliminary words with timings at intervals of $2T_s$. However, the starting times of the preliminary word selection process are limited by the word connection managing unit 22 to timings at intervals of $4T_s$.

Thus, the locations of end nodes include locations that are not allowed as starting times of the preliminary word selection process (such a location are referred to as an inhibited location). If a word starting at an inhibited location is requested to be selected as a preliminary word, the word connection managing unit 22 selects a word from the preliminarily selected words having a start time at one of allowed locations (at intervals of $4T_s$) and interpolates it at the inhibited location as shown in FIG. 18(D).

Figure 19:
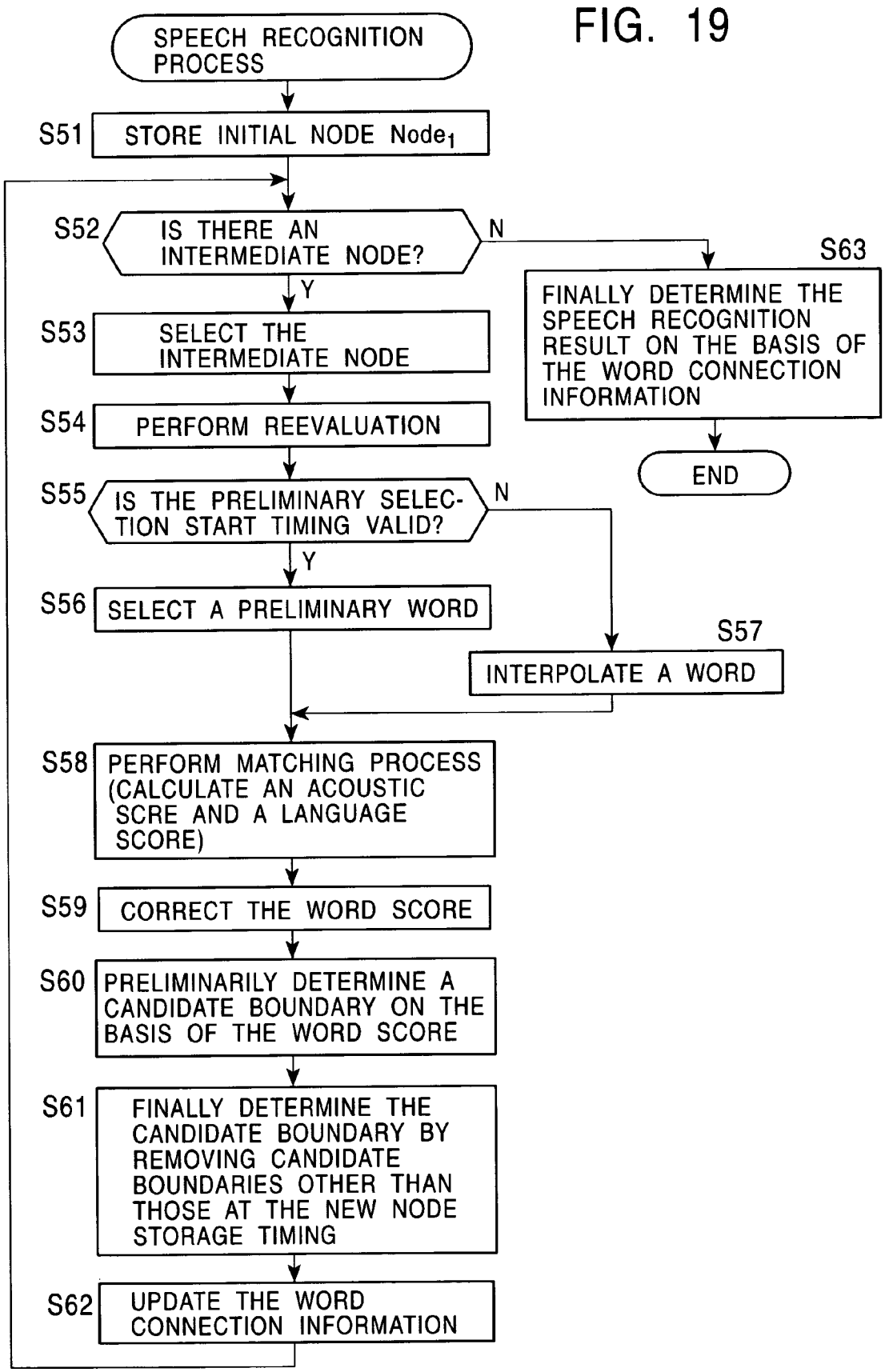
FIG. 19 is a flow chart illustrating a speech recognition process performed by the speech recognition apparatus shown in FIG. 17.

Referring to a flow chart shown in FIG. 19, a speech recognition process performed by the speech recognition apparatus shown in FIG. 17 is described below.

In the process performed by the speech recognition apparatus shown in FIG. 17, steps S51 to S54 are similar to steps S1 to S4 shown in FIG. 5.

In step S54, as in step S4 in FIG. 5, the reevaluation unit 15 corrects the word connection information stored in the word connection information storage unit 16. If the matching unit 14 receives, via the control unit 11, a notification of the completion of the correction, the matching unit 14 outputs a preliminary word selection request together with a node of interest and associated time information.

The preliminary word selection request output from the matching unit 14 together with the node of interest and the associated time information is received by the word connection managing unit 22.

Upon receiving the preliminary word selection request, the word connection managing unit 22 determines, in step S55, whether the preliminary word selection request received from the matching unit 14 specifies that a word starting at an allowed time should be selected. If it is determined in step S55 that the preliminary word selection request specifies that a word starting at an allowed time should be selected, the word connection managing unit 22 transfers the received preliminary word selection request to the preliminary word selector 13. Thereafter, the process proceeds to step S56. In step S56, the preliminary word selector 13 performs the preliminary word selection process in a similar manner as in step S5 in FIG. 5, and the preliminary word selector 13 supplies the obtained words (selected words) to the word connection managing unit 22. The word connection managing unit 22 temporarily retains the selected words (starting at allowed times) supplied from the preliminary word selector 13 and also supplies them as the result of the preliminary word selection to the matching unit 14. Thereafter, the process proceeds to step S58.

On the other hand, in the case where it is determined in step S55 that the preliminary word selection request does not specify that a word starting at an allowed time should be selected but specifies that a word starting at an inhibited time should be selected, the process proceeds jumps to step S57. In step S57, The word connection managing unit 22 extracts words starting at allowed times immediately preceding and following the inhibited time from the preliminarily selected words already received from the preliminary word selector 13, and interpolates the extracted words at the inhibited time as a result of the preliminary word selection. The word connection managing unit 22 supplies, to the matching unit 14, the supplemental words interpolated at the inhibited time as the result of the preliminary word selection. Thereafter, the process proceeds to step S58.

In step S58, the matching unit 14 calculates the acoustic scores and the language scores for all selected words supplied from the preliminary word selector 13 in a similar manner to step S6 shown in FIG. 5. In the next step S59, the matching unit 14 corrects the acoustic scores and the language scores of the respective words by replacing them with the acoustic scores and the language scores of the same word ending at different times in accordance with equation (2). Furthermore, the matching unit 14 calculates the corrected word scores from the corrected acoustic scores and the corrected language scores. In the next step S60, the matching unit 14 prunes the words on the basis of the corrected word scores and determines (tentatively) candidates for the locations of boundaries of words without limiting the locations.

Thereafter, the matching unit 14 supplies the words remaining after the pruning in step S60 to the control unit 11 together with the acoustic scores, the language scores, and the end times of the words.

If the control unit 11 receives the acoustic scores, the language scores, and the end times of words from the matching unit 14, the control unit 11 supplies the end times of the respective words to the word connection managing unit 21.

In the next step S61, the word connection managing unit 21 limits the end times given as candidates for the word boundaries to the new node storage timings. That is, the end times which are not at any of new node storage timing locations are discarded, and the remaining end points are employed as final candidates for the word boundaries. The word connection managing unit 21 returns the finally remaining end times to the control unit 11. In step S62, as in step S7 shown in FIG. 5, the control unit 11 updates, via the word connection managing unit 21, the word connection information stored in the word connection information storage unit 16, for the words whose end time has been returned from the word connection managing unit 21.

Thereafter, the process returns to step S52 and the above-described process is repeated.

In the case where it is determined in step S52 that there is no intermediate node, the process jumps to step S63. In step S63, the control unit 11 refers to the word connection information to determine the recognition result for the speech uttered by the user in a similar manner to step S8 shown in FIG. 5. The speech recognition result is output, and the whole process is completed.

Limiting the timings using the word connection managing units 21 and 22 in the above-described manner allows the processing efficiency to be improved further without causing degradation in the recognition performance.

Simulation performed by the inventors of the present invention indicates that when the locations of end nodes stored as the word connection information are limited by the word connection managing unit 21 to times at intervals of $4T_s$ and the starting timings of the preliminary word selection process are limited by the word connection managing unit 22 to times at intervals of $8T_s$, a recognition rate, similar to that obtained when the above limitations are not imposed, can be obtained, and the amount of calculation can be reduced by about 15%.

Figure 18:
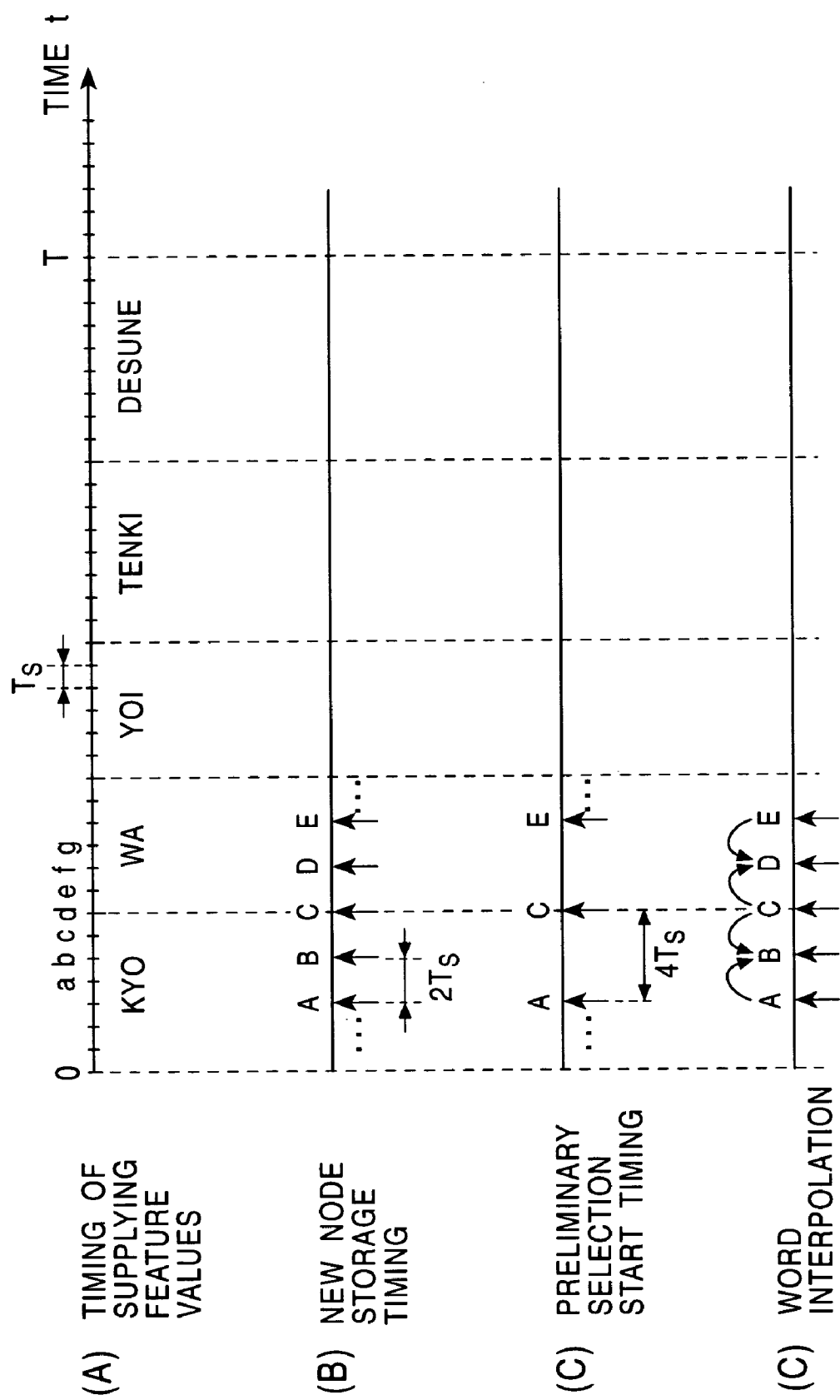
FIG. 18 is a diagram illustrating a process performed by word connection managing units 21 and 22.

In the embodiment shown in FIG. 18, the timing limitations are performed by the word connection managing unit 22 such that the limited timings are synchronous with 2 times the timings limited by the word connection managing unit 21. Alternatively, timings may be limited independently by the word connection managing units 21 and 22. The intervals of timings limited by the word connection managing unit 21 are not necessarily needed to be fixed, but can be varied. Similarly, the intervals of timings limited by the word connection managing unit 22 are not necessarily needed to be fixed, but can be varied.

The speech recognition apparatus according to any embodiment described above can be used for various purposes. For example, a database can be searched in response to a voice uttered by a user, and various kinds of devices can be controlled in accordance with a voice command. Data can be input to various kinds of devices in accordance with a voice uttered by a user. Furthermore, it can also be used in voice interactive systems. More specific examples of applications include a database retrieval apparatus that displays map information in response to a voice inquiry about a place, an industrial robot that sorts baggage in response to a voice command, a dictation system for producing a text in accordance with a voice input without having to use a keyboard, and an interactive system used by a robot to make conversation with a user.

The processing sequence described above may be executed by hardware or software. When the processes are performed by software, a software program is installed on a general-purpose computer or the like.

Figure 20:
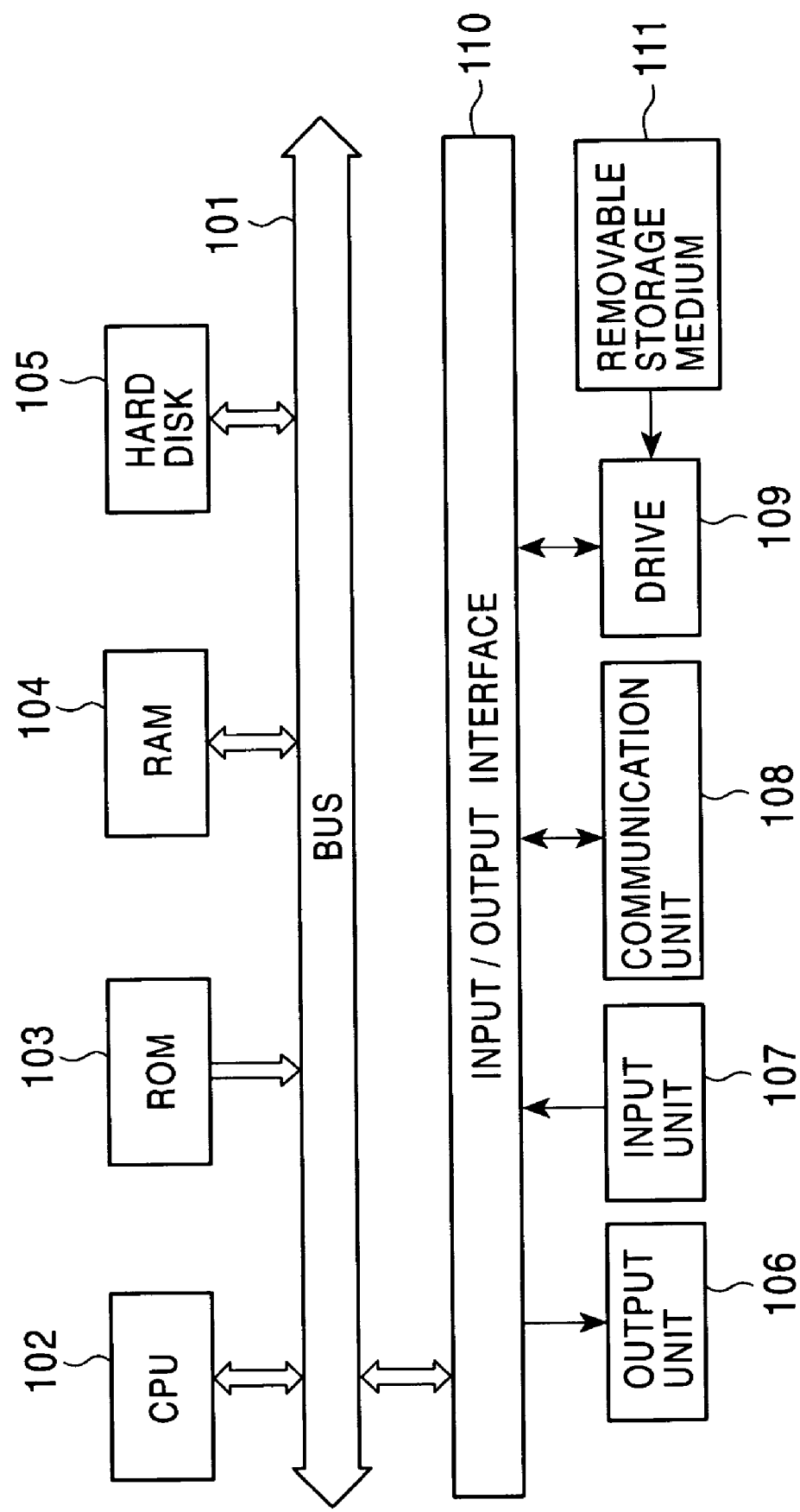
FIG. 20 is block diagram illustrating a computer according to an embodiment of the present invention.

FIG. 20 illustrates an embodiment of the invention in which a program used to execute the processes described above is installed on a computer.

The program may be stored, in advance, on a hard disk 105 serving as a storage medium or in a ROM 103 which are disposed inside the computer.

Alternatively, the program may be stored (recorded) temporarily or permanently on a removable storage medium 111 such as a floppy disk, a CD-ROM (Compact Disc Read Only Memory), an MO (Magnetooptical) disk, a DVD (Digital Versatile Disc), a magnetic disk, or a semiconductor memory. Such a removable storage medium 111 may be provided in the form of so-called package software.

Instead of installing the program from the removable storage medium 111 onto the computer, the program may also be transferred to the computer from a download site via a digital broadcasting satellite by means of radio transmission or via a network such as an LAN (Local Area Network) or the Internet by means of wire communication. In this case, the computer receives, using a communication unit 108, the program transmitted in such a manner and installs the program on the hard disk 105 disposed in the computer.

The computer includes a CPU (Central Processing Unit) 102. When a user inputs a command by operating an input unit 107 such as a keyboard or a mouse, the command is transferred to the CPU 102 via an input/output interface 110 and a bus 101. In accordance with the command, the CPU 102 executes a program stored in a ROM (Read Only Memory) 103. Alternatively, the CPU 102 may execute by loading in a RAM (Random Access Memory) 104. A program stored on a hard disk 105, a program which has been installed on the hard disk 105 after being transferred from a satellite or a network and received from a communication unit 108, or a program which has been installed on the hard disk 105 after being read from a removable storage medium 111 loaded on a drive 109. Thereby, the CPU 102 performs the process described above with reference to the flow charts and block diagrams. The CPU 102 outputs the result of the process, as required, to an output unit such as an LCD (Liquid Crystal Display) or a speaker via the input/output interface 110. The result of the process may also be transmitted via the communication unit 108 or may be stored on the hard disk 105.

In the present invention, the processing steps described in the program to be executed by the computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may transferred to a computer at a remote location and may be executed thereby.

INDUSTRIAL APPLICABILITY

In the first speech recognition apparatus, the first speech recognition method, and the first storage medium, the scores of words to be recognized are calculated and a word series to be employed as a candidate for a speech recognition result is produced on the basis of the calculated scores. Connection relationships among words in the word series to be employed as a candidate for the speech recognition result are corrected, a word series as the speech recognition result is determined on the basis of the corrected connection relationships. In the above process, locations of boundaries between words, represented by the connection relationships, in a word series to be employed as a candidate of the speech recognition result are limited. Thus, the processing efficiency can be improved.

In the second speech recognition apparatus, the second speech recognition method, and the second storage medium, one or more words to be placed following an already-selected word included in a word series to be employed as a candidate for the speech recognition result is selected from a set of speech-recognizable words, and the scores for the selection words are calculated. Word series employed as candidates for the speech recognition result are produced on the basis of the calculated scores, and one of them is selected as a determinate speech recognition result. In the above process, start locations words selected from the set of speech-recognizable words are limited. Thus, the processing efficiency can be improved.

The invention claimed is:

1. A speech recognition apparatus that calculates a score indicating the likelihood of a speech recognition result for an input speech and recognizes the speech on the basis of the score, the speech recognition apparatus comprising:
    production means for calculating the scores of words to be recognized and producing, on the basis of the calculated scores, a word series as a candidate for a speech recognition result;
    storage means for storing connection relationships among words in the word series to be employed as a candidate for the speech recognition result;
    correction means for correcting the connection relationships stored in the storage means;
    determining means for determining a word series as the speech recognition result on the basis of the corrected connection relationships; and
    word boundary limiting means for limiting the location of a boundary between words represented by the connection relationships stored in the storage means.

2. A speech recognition apparatus according to claim 1, wherein the production means calculates the score on the basis of feature values supplied from extraction means for extracting feature values of the input speech; and
    the word boundary limiting means limits the location of the boundary of words to timings extracted partially from timings at which the feature values are supplied.

3. A speech recognition apparatus according to claim 1, further comprising:
    score correcting means for correcting the score of the word calculated by the production means; and
    tentatively determining means for tentatively determining, on the basis of the corrected score, a candidate for the location of a boundary between words in a word series to be employed as a candidate for the speech recognition result;

wherein the word boundary limiting means limits the candidate location of the boundary between words tentatively determined by the tentatively determining means.

4. A speech recognition apparatus according to claim 3, wherein the score correcting means corrects the score of a word having a boundary at a predetermined location by replacing the score with a score of a word having a boundary at another location close to the former location.

5. A speech recognition apparatus according to claim 1, further comprising selection means for selecting one or more words to be placed following an already-selected word included in a word series to be employed as a candidate for the speech recognition result, from a set of speech-recognizable words, wherein the production means calculates the score of the one or more words selected by the selection means.

6. A speech recognition apparatus according to claim 5, further comprising start location limiting means for limiting the start location of a word selected by the selection means.

7. A speech recognition apparatus according to claim 6, wherein the production means calculates the score on the basis of the feature value supplied from extraction means for extracting a feature value of the input speech; and the start location limiting means limits the start location of the word to timings extracted partially from the timings at which the feature values are supplied.

8. A speech recognition apparatus according to claim 6, wherein the start location limiting means limits the start location of a word to locations extracted partially from locations allowable for word boundary locations limited by the word boundary limiting means.

9. A speech recognition apparatus according to claim 6, further comprising supplementing means for supplementing words whose score is to be calculated by the production means with a word whose start location is at an inhibited location inhibited by the start location limiting means from becoming a start position of a word.

10. A speech recognition apparatus according to claim 9, wherein supplementing means for supplementing with a word whose start location is at an inhibited location by placing, at the inhibited location, a word whose start location is at an allowed location which is close to the inhibited location and which is allowed by the start location limiting means to become a start location of a word.

11. A speech recognition apparatus according to claim 10, wherein the supplementing means for supplementing with a word whose start location is at an inhibited location by assigning weights to allowed locations depending on the distance from the inhibited location and selecting a supplemental word in accordance with the weights.

12. A speech recognition apparatus according to claim 6, wherein the set of speech-recognizable words are categorized into two or more groups;

the selection means selects a word from each categorized group; and the start location limiting means limits the start locations of words selected by the selection means in accordance with different rules depending on the categorized group.

13. A speech recognition method that calculates a score indicating the likelihood of a speech recognition result for an input speech and recognizes the speech on the basis of the score, the speech recognition method comprising the step of:

calculating the scores of words to be recognized and producing, on the basis of the calculated scores, a word series as a candidate for a speech recognition result;

storing connection relationships among words in the word series to be employed as a candidate for the speech recognition result;

correcting the connection relationships stored in the storage step;

determining a word series as the speech recognition result on the basis of the corrected connection relationships; and limiting the location of a boundary between words represented by the connection relationships stored in the storage step.

14. A storage medium including a program stored therein for causing a computer to perform a speech recognition process of calculating a score indicating the likelihood of a speech recognition result for an input speech and recognizing the speech on the basis of the score, the program comprising the steps of:

calculating the scores of words to be recognized and producing, on the basis of the calculated scores, a word series as a candidate for a speech recognition result;

storing connection relationships among words in the word series to be employed as a candidate for the speech recognition result;

correcting the connection relationships stored in the storage step;

determining a word series as the speech recognition result on the basis of the corrected connection relationships; and limiting the location of a boundary between words represented by the connection relationships stored in the storage step.

15. A speech recognition apparatus that calculates a score indicating the likelihood of a speech recognition result for an input speech and recognizes the speech on the basis of the score, the speech recognition apparatus comprising:

selection means for selecting one or more words to be placed following an already-selected word included in a word series to be employed as a candidate for the speech recognition result, from a set of speech-recognizable words, production means for calculating the score of the one or more words selected by the selection means and producing, on the basis of the calculated scores, a word series to be employed as a candidate for a speech recognition result;

determining means for selecting one word series as a determinate speech recognition result from the word series that have been produced as candidates for the speech recognition result; and start location limiting means for limiting the start location of a word selected by the selection means.

16. A speech recognition apparatus according to claim 15, wherein the production means calculates the score on the basis of the feature value supplied from extraction means for extracting a feature value of the input speech; and the start location limiting means limits the start location of the word to timings extracted partially from the timings at which the feature values are supplied.

17. A speech recognition apparatus according to claim 15, wherein supplementing means for supplementing words whose score is to be calculated by the production means with a word whose start location is at an inhibited location inhibited by the start location limiting means from becoming a start position of a word.

18. A speech recognition apparatus according to claim 17, wherein supplementing means for supplementing with a word whose start location is at an inhibited location by placing, at the inhibited location, a word whose start location is at an allowed location which is close to the inhibited location and which is allowed by the start location limiting means to become a start location of a word.

19. A speech recognition apparatus according to claim 18, wherein the supplementing means for supplementing with a word whose start location is at an inhibited location by assigning weights to allowed locations depending on the distance from the inhibited location and selecting a supplemental word in accordance with the weights.

20. A speech recognition apparatus according to claim 15, wherein
the set of speech-recognizable words are categorized into two or more groups;
the selection means selects a word from each categorized group; and
the start location limiting means limits the start locations of words selected by the selection means in accordance with different rules depending on the categorized group.

21. A speech recognition apparatus according to claim 15, further comprising:
storage means for storing connection relationships among words in the word series to be employed as a candidate for the speech recognition result; and
correction means for correcting the connection relationships;
wherein the determining means determines a word series as the speech recognition result on the basis of the corrected connection relationships.

22. A speech recognition method that calculates a score indicating the likelihood of a speech recognition result for an input speech and recognizes the speech on the basis of the score, the speech recognition method comprising the step of:
selecting one or more words to be placed following an already-selected word included in a word series to be employed as a candidate for the speech recognition result, from a set of speech-recognizable words;
calculating the score of the one or more words selected in the selection step and producing, on the basis of the calculated scores, a word series to be employed as a candidate for a speech recognition result;
selecting one word series as a determinate speech recognition result from the word series that have been produced as candidates for the speech recognition result; and
limiting the start location of a word selected in the selection step.

23. A storage medium including a program stored therein for causing a computer to perform a speech recognition process of calculating a score indicating the likelihood of a speech recognition result for an input speech and recognizing the speech on the basis of the score, the program comprising the steps of:
selecting one or more words to be placed following an already-selected word included in a word series to be employed as a candidate for the speech recognition result, from a set of speech-recognizable words;
calculating the score of the one or more words selected in the selection step and producing, on the basis of the calculated scores, a word series to be employed as a candidate for a speech recognition result;
selecting one word series as a determinate speech recognition result from the word series that have been produced as candidates for the speech recognition result; and
limiting the start location of a word selected in the selection step.

* * * * *